(12) United States Patent
Pyeon et al.

(10) Patent No.: US 8,694,692 B2
(45) Date of Patent: *Apr. 8, 2014

(54) APPARATUS AND METHOD FOR PRODUCING DEVICE IDENTIFIERS FOR SERIALLY INTERCONNECTED DEVICES OF MIXED TYPE

(71) Applicant: Mosaid Technologies Incorporated, Ottawa (CA)

(72) Inventors: Hong Beom Pyeon, Kanata (CA); HakJune Oh, Kanata (CA); Jin-Ki Kim, Kanata (CA); Shuji Sumi, Kanata (CA)

(73) Assignee: MOSAID Technologies Incorporated, Ottawa, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,248

(22) Filed: Nov. 7, 2012

(65) Prior Publication Data

US 2013/0067118 A1 Mar. 14, 2013

Related U.S. Application Data

(62) Division of application No. 11/692,452, filed on Mar. 28, 2007, now Pat. No. 8,331,361.

(60) Provisional application No. 60/887,401, filed on Jan. 31, 2007, provisional application No. 60/868,773, filed on Dec. 6, 2006.

(51) Int. Cl.
*G06F 3/00* (2006.01)

(52) U.S. Cl.
USPC .................................. 710/10; 710/8

(58) Field of Classification Search
None
See application file for complete search history.

(56) References Cited

U.S. PATENT DOCUMENTS

| | | |
|---|---|---|
| 4,174,536 A | 11/1979 | Misunas et al. |
| 4,360,870 A | 11/1982 | McVey |

(Continued)

FOREIGN PATENT DOCUMENTS

| | | |
|---|---|---|
| EP | 1717985 A1 | 11/2006 |
| WO | 01/69411 | 9/2001 |

OTHER PUBLICATIONS

PCT Patent Application No. PCT/CA2007/002173, International Search Report dated Apr. 7, 2008.

(Continued)

*Primary Examiner* — Kris Rhu
(74) *Attorney, Agent, or Firm* — Shin Hung; Borden Ladner Gervais LLP

(57) ABSTRACT

A plurality of memory devices of mixed type (e.g., DRAMs, SRAMs, MRAMs, and NAND-, NOR- and AND-type Flash memories) are serially interconnected. Each device has device type information on its device type. A specific device type (DT) and a device identifier (ID) contained in a serial input (SI) as a packet are fed to one device of the serial interconnection. The device determines whether the fed DT matches the DT of the device. In a case of match, a calculator included in the device performs calculation to generate an ID accompanying the fed DT for another device and the fed ID is latched in a register of the device. In a case of no-match, the ID generation is skipped and no ID is generated for another device. The DT is combined with the generated or the received ID depending on the device type match determination. The combined DT and ID is as a packet transferred to a next device. Such a device type match determination and ID generation or skip are performed in all devices of the serial interconnection. With reference to device type provided to the interconnected devices, IDs are sequentially generated. The SI containing the DT, the ID and an ID generation command is transmitted in a packet basis to a next device.

22 Claims, 22 Drawing Sheets

(56) References Cited

U.S. PATENT DOCUMENTS

| | | |
|---|---|---|
| 4,617,566 A | 10/1986 | Diamond |
| 4,733,376 A | 3/1988 | Ogawa |
| 4,796,231 A | 1/1989 | Pinkham |
| 5,126,808 A | 6/1992 | Montalvo et al. |
| 5,136,292 A | 8/1992 | Ishida |
| 5,175,819 A | 12/1992 | Le Ngoc et al. |
| 5,204,669 A | 4/1993 | Dorfe et al. |
| 5,243,703 A | 9/1993 | Farmwald et al. |
| 5,249,270 A | 9/1993 | Stewart et al. |
| 5,280,539 A | 1/1994 | Yeom et al. |
| 5,319,598 A | 6/1994 | Aralis et al. |
| 5,357,621 A | 10/1994 | Cox |
| 5,365,484 A | 11/1994 | Cleveland et al. |
| 5,404,460 A | 4/1995 | Thomsen et al. |
| 5,430,859 A | 7/1995 | Norman et al. |
| 5,440,694 A | 8/1995 | Nakajima |
| 5,452,259 A | 9/1995 | McLaury |
| 5,473,563 A | 12/1995 | Suh et al. |
| 5,473,566 A | 12/1995 | Rao |
| 5,473,577 A | 12/1995 | Miyake et al. |
| 5,535,336 A | 7/1996 | Smith et al. |
| 5,596,724 A | 1/1997 | Mullins et al. |
| 5,602,780 A | 2/1997 | Diem et al. |
| 5,636,342 A | 6/1997 | Jeffries |
| 5,671,178 A | 9/1997 | Park |
| 5,721,840 A | 2/1998 | Soga |
| 5,740,379 A | 4/1998 | Hartwig |
| 5,761,146 A | 6/1998 | Yoo et al. |
| 5,771,199 A | 6/1998 | Lee |
| 5,802,006 A | 9/1998 | Ohta |
| 5,806,070 A | 9/1998 | Norman et al. |
| 5,809,013 A * | 9/1998 | Kackman ............. 370/253 |
| 5,809,070 A | 9/1998 | Krishnan |
| 5,818,785 A | 10/1998 | Ohshima |
| 5,828,899 A * | 10/1998 | Richard et al. ............. 710/8 |
| 5,835,935 A | 11/1998 | Estakhri et al. |
| 5,859,809 A | 1/1999 | Kim |
| 5,872,994 A | 2/1999 | Akiyama et al. |
| 5,937,425 A | 8/1999 | Ban |
| 5,941,974 A | 8/1999 | Babin |
| 5,954,804 A | 9/1999 | Farmwald et al. |
| 5,959,930 A | 9/1999 | Sakurai |
| 5,995,417 A | 11/1999 | Chen et al. |
| 6,002,638 A | 12/1999 | John |
| 6,009,479 A | 12/1999 | Jeffries |
| 6,085,290 A | 7/2000 | Smith et al. |
| 6,091,660 A | 7/2000 | Sasaki et al. |
| 6,107,658 A | 8/2000 | Itoh et al. |
| 6,144,576 A | 11/2000 | Leddige et al. |
| 6,148,364 A | 11/2000 | Srinivasan et al. |
| 6,178,135 B1 | 1/2001 | Kang |
| 6,304,921 B1 | 10/2001 | Rooke |
| 6,317,350 B1 | 11/2001 | Pereira et al. |
| 6,317,352 B1 | 11/2001 | Halbert et al. |
| 6,317,812 B1 | 11/2001 | Lofgren et al. |
| 6,438,064 B2 | 8/2002 | Ooishi |
| 6,442,098 B1 | 8/2002 | Kengeri |
| 6,442,644 B1 | 8/2002 | Gustavson et al. |
| 6,453,365 B1 | 9/2002 | Habot |
| 6,535,948 B1 | 3/2003 | Wheeler et al. |
| 6,567,904 B1 | 5/2003 | Khandekar et al. |
| 6,584,303 B1 | 6/2003 | Kingswood et al. |
| 6,594,183 B1 | 7/2003 | Lofgren et al. |
| 6,601,199 B1 | 7/2003 | Fukuda et al. |
| 6,611,466 B2 | 8/2003 | Lee et al. |
| 6,658,509 B1 | 12/2003 | Bonella et al. |
| 6,658,582 B1 | 12/2003 | Han |
| 6,680,904 B1 | 1/2004 | Kaplan et al. |
| 6,715,044 B2 | 3/2004 | Lofgren et al. |
| 6,718,432 B1 | 4/2004 | Srinivasan |
| 6,732,221 B2 | 5/2004 | Ban |
| 6,754,807 B1 | 6/2004 | Parthasarathy et al. |
| 6,763,426 B1 | 7/2004 | James et al. |
| 6,799,235 B2 | 9/2004 | Bormann et al. |
| 6,807,103 B2 | 10/2004 | Cavaleri et al. |
| 6,816,933 B1 | 11/2004 | Andreas |
| 6,850,443 B2 | 2/2005 | Lofgren et al. |
| 6,853,557 B1 | 2/2005 | Haba et al. |
| 6,853,573 B2 | 2/2005 | Kim et al. |
| 6,928,501 B2 | 8/2005 | Andreas et al. |
| 6,944,697 B2 | 9/2005 | Andreas |
| 6,950,325 B1 | 9/2005 | Chen |
| 6,967,874 B2 | 11/2005 | Hosono |
| 6,996,644 B2 | 2/2006 | Schoch et al. |
| 7,032,039 B2 | 4/2006 | DeCaro |
| 7,043,630 B1 | 5/2006 | Xia |
| 7,073,022 B2 | 7/2006 | El-Batal et al. |
| 7,299,303 B2 * | 11/2007 | Calligaro et al. ............. 710/10 |
| 7,853,727 B2 * | 12/2010 | Pyeon et al. ............. 710/8 |
| 2002/0188781 A1 | 12/2002 | Schoch et al. |
| 2003/0043771 A1 * | 3/2003 | Mizutani et al. ............. 370/338 |
| 2003/0074505 A1 | 4/2003 | Andreas et al. |
| 2003/0088655 A1 * | 5/2003 | Leigh et al. ............. 709/223 |
| 2003/0128702 A1 | 7/2003 | Satoh et al. |
| 2003/0174075 A1 | 9/2003 | Iwata |
| 2003/0221061 A1 | 11/2003 | El-Batal et al. |
| 2004/0001380 A1 | 1/2004 | Becca et al. |
| 2004/0019736 A1 | 1/2004 | Kim et al. |
| 2004/0024960 A1 | 2/2004 | King et al. |
| 2004/0039854 A1 | 2/2004 | Estakhri et al. |
| 2004/0047298 A1 * | 3/2004 | Yook et al. ............. 370/254 |
| 2004/0148482 A1 | 7/2004 | Grundy et al. |
| 2004/0199721 A1 | 10/2004 | Chen |
| 2004/0203859 A1 * | 10/2004 | Yuen et al. ............. 455/456.1 |
| 2004/0230738 A1 | 11/2004 | Lim |
| 2005/0160218 A1 | 7/2005 | See et al. |
| 2005/0213421 A1 | 9/2005 | Polizzi et al. |
| 2005/0273539 A1 | 12/2005 | Yamamoto |
| 2006/0050594 A1 | 3/2006 | Park |
| 2006/0200602 A1 | 9/2006 | James |
| 2006/0212537 A1 * | 9/2006 | Hans et al. ............. 709/217 |
| 2007/0083701 A1 | 4/2007 | Kapil |
| 2007/0165457 A1 | 7/2007 | Kim |
| 2007/0234071 A1 | 10/2007 | Pyeon |
| 2008/0028176 A1 | 1/2008 | Bartley et al. |
| 2008/0080492 A1 | 4/2008 | Pyeon et al. |
| 2008/0086590 A1 | 4/2008 | Urabe |

OTHER PUBLICATIONS

PCT Patent Application No. PCT/CA2007/002171, International Search Report dated Mar. 17, 2008.

PCT Patent Application No. PCT/CA2007/002193, International Search Report dated Apr. 7, 2008.

PCT Patent Application No. PCT/CA2007/002182, International Search Report dated Mar. 18, 2008.

PCT Patent Application No. PCT/CA2007/002147, Written Opinion dated Mar. 10, 2008.

King et al., "Communicating with Daisy Chained MCP42XXX Digital Potentiometers", Microchip Technology, Jan. 30, 2001, pp. 1-8.

Samsung Electronics Co. Ltd, "256M×8 Bit / 128 M×16 Bit / 512M×8 Bit NAND Flash Memory", K9K4G08U1M, May 6, 2005, pp. 1-41.

Toshiba, "2GBIT (256M×8 Bits) CMOS NAND E2PROM", TH58NVG1S3AFT05, May 19, 2003, pp. 1-32.

Atmel Corp., "High Speed Small Sectored SPI Flash Memory", Sep. 2006, pp. 1-22.

64 Megabit CMOS 3.0 Volt Flash Memory with 50MHz SPI, Spansion, Sep. 2006, pp. 1-22.

Intel Corporation, "Intel® Advanced+ Boot Block Flash Memory (C3)", May 2005, pp. 1-72.

M-Systems Flash Disk Pioneers Ltd., "DiskOnChip H1 4Gb (512MByte) and 8Gb (1 GByte) High Capacity Flash Disk with NAND and x2 Technology", Data Sheet, Rev. 0.5 (Preliminary), Jul. 2005, pp. 1-66.

Tal, A., "Guidelines for Integrating DiskOnChip in a Host System", AP-DOC-1004, Rev. 1.0, M-Systems Flash Pioneers Ltd., Aug. 2004, pp. 1-15.

Samsung Electronics Co. Ltd, OneNAND4G(KFW4G16Q2M-DEB6), OneNAND2G(KFH2G16Q2M-DEB6), OneNAND1G(KFW1G16Q2M-DEB6) Flash Memory, OneNAND™ Specification Ver. 1.2, pp. 1-125, Dec. 23, 2005.

(56) References Cited

OTHER PUBLICATIONS

Kennedy, J., et al., "A 2Gb/s Point-to-Point Heterogeneous Voltage Capable DRAM Interface for Capacity-Scalable Memory Subsystems", ISSCC 2004/Session 1/DRAM/11.8, IEEE International Solid-State Circuits Conference, Feb. 15-19, 2004, vol. 1, 10 pages.

Kim, Jae-Kwan, et al., "A 3.6Gb/s/pin Simultaneous Bidirectional (SBD) I/O Interface for High-Speed DRAM", ISSCC 2004/Session 22/DSL and Multi-Gb/s I/O 22.7, IEEE International Solid-State Circuits Conference Feb. 15-19, 2004, vol. 1, pp. 414-415.

"HyperTransport TM I/O Link Specification", Revision 2.00, Document No. HTC20031217-0036-00, Hypertransport Technology Consortium, pp. 1-325, 2001.

"IEEE Standard for High-Bandwidth Memory Interface Based on Scalable Coherent Interface (SCI) Signaling Technology (RamLink)", IEEE Std. 1596.4-1996, The Institute of Electrical Electronics Engineers, Inc., pp. i-91, (Mar. 1996).

Oshima, et al., "High-Speed Memory Architectures for Multimedia Applications", Circuits & Devices, IEEE 8755-3996/97, pp. 8-13, Jan. 1997.

Gjessing, S., et al., "RamLink: A High-Bandwidth Point-to-Point Memory Architecture", Proceedings CompCom 1992, IEEE 0-8186-2655-0/92, pp. 328-331, Feb. 24-28, 1992.

Gjessing, S., et al., "Performance of the RamLink Memory Architecture", Proceedings of the Twenty-Seventh Annual Hawaii International Conference on System Sciences, IEEE 1060-3425/94, pp. 154-162, Jan. 1994.

Gjessing, S., et al., "A RAM Link for High Speed", Special Report/Memory, IEEE Spectrum, pp. 52-53, Oct. 1992.

Diamond, S.L., "SyncLink: High: High-speed DRAM for the Future", Micro Standards, IEEE Micro, pp. 74-75, Dec. 1996.

Samsung Electronics, "DDR2 Fully Buffered DIMM 240pin FBDIMMS based on 512Mb C-die" Rev. 1.3, Sep. 2006, pp. 1-32, Sep. 2006.

"HyperTransport TM I/O Link Specification", Revision 3.00, Document No. HTC20051222-0046-0008, Hypertransport Technology Consortium, pp. 1-428, Apr. 2006.

Atmel, "8-megabit 2.5-volt Only or 2.7-volt Only DataFlash®," Technical Specification, Atmel, Rev. 2225H-DFLSH Sep. 2004.

Samsung Electronics, "K9XXG08UXM Preliminary Flash Memory," Technical Specification, Samsung Electronics, May 3, 2005.

"1024K12C™ CMOS Serial EEPROM," Technical Specification, Microchip Technology Inc., Feb. 16, 2006.

"The I2C-Bus Specification," Version 2.1, Philips Semiconductors, Jan. 2000.

"16 Mbit LPC Serial Flash," Preliminary Specification, Silicon Storage Technology Inc., Sep. 2006.

"16 Mbit SPI Serial Flash," Preliminary Specification, Silicon Storage Technology Inc., Apr. 2005.

"2Mbit, Low Voltage, Serial Flash Memory with 40 Mhz SPI Bus Interface," Technical Specification, STMicroelectronics Group of Companies Aug. 2005, pp. 1-40.

"NAND Flash Applications Design Guide," Revision 1.0, Toshiba America Electronics Components, Inc., Apr. 2003.

McVey, JM "Programmable Identification for I/O Device", IBM Technical Disclosure Bulletin, Aug. 1979.

\* cited by examiner

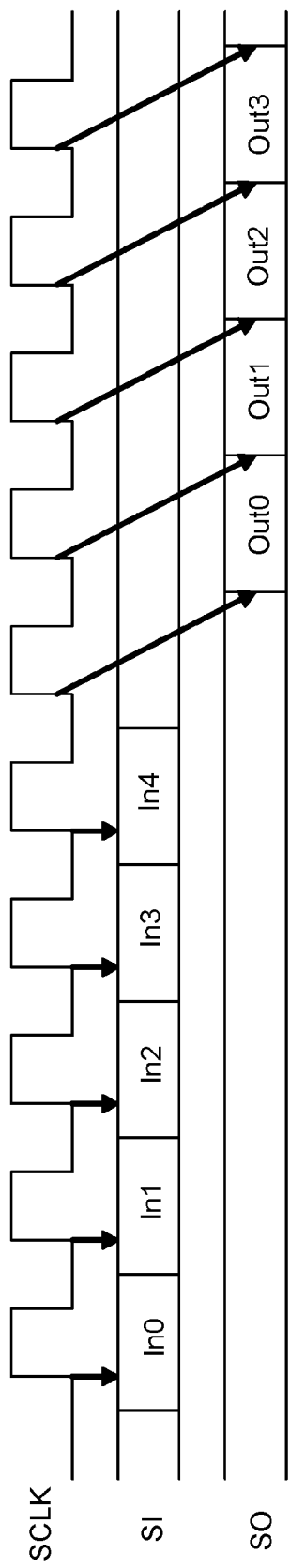
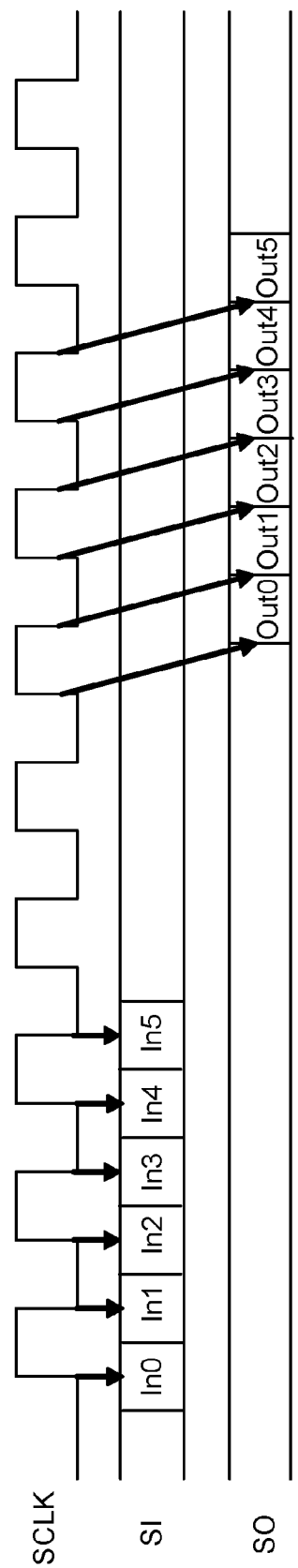
FIG. 2A
FIG. 2B

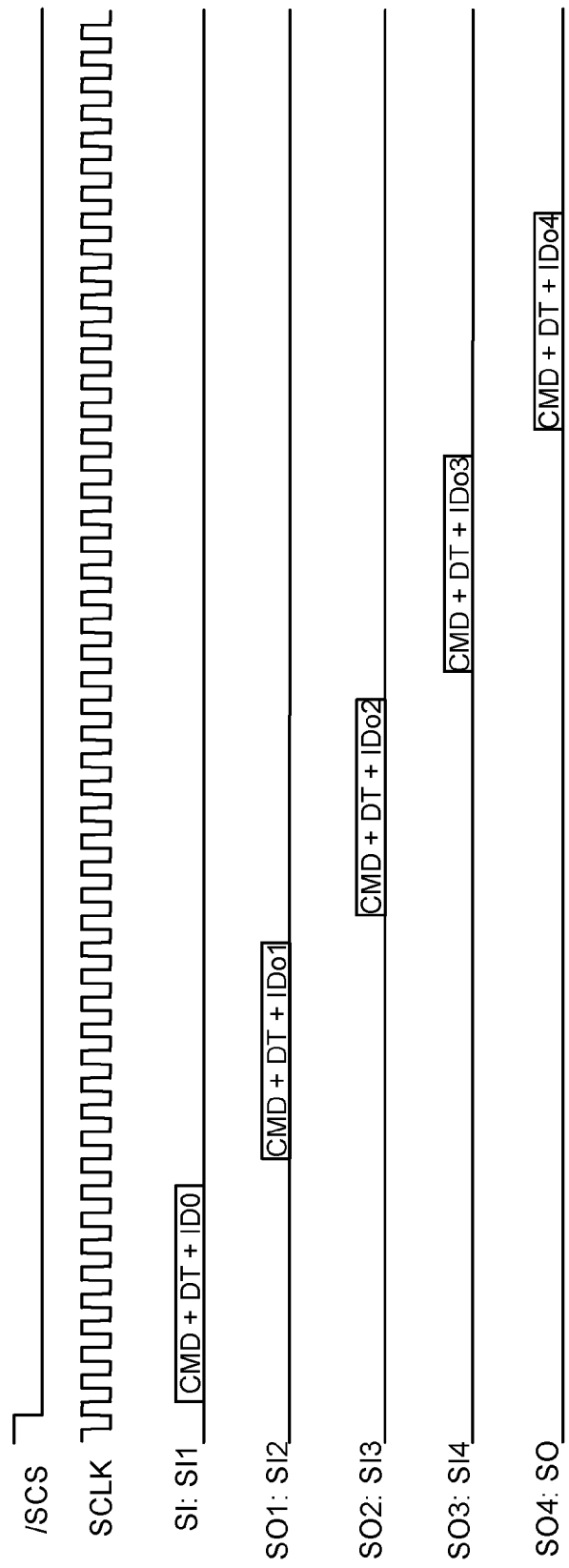

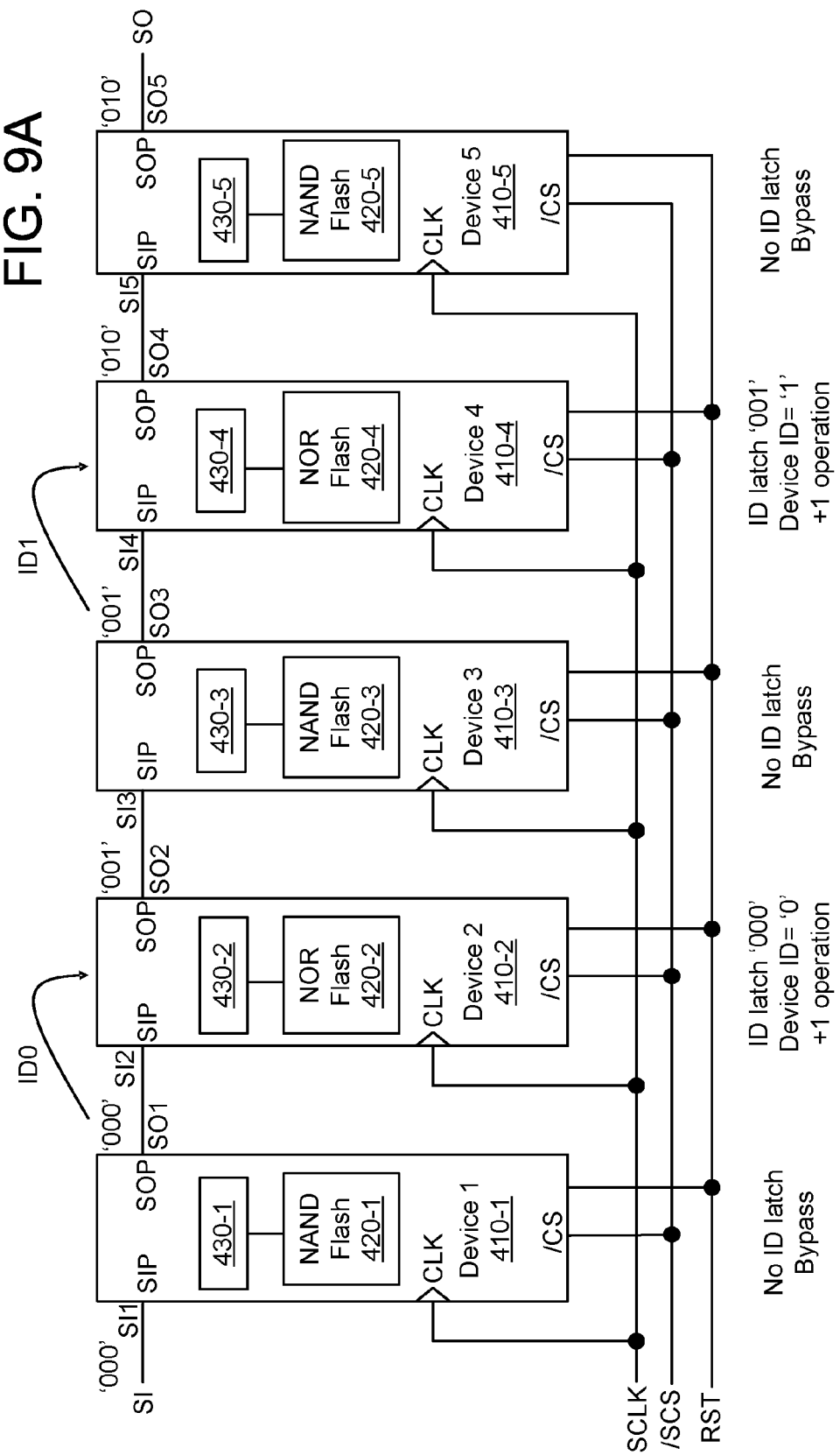

APPARATUS AND METHOD FOR PRODUCING DEVICE IDENTIFIERS FOR SERIALLY INTERCONNECTED DEVICES OF MIXED TYPE

CROSS REFERENCE TO RELATED APPLICATIONS

This application is a divisional of U.S. patent application Ser. No. 11/692,452, filed on Mar. 28, 2007, which claims the benefit of priority from U.S. Provisional Patent Application No. 60/887,401 filed Jan. 31, 2007, the disclosure of which is expressly incorporated herein by reference in its entirety, and of U.S. Provisional Patent Application No. 60/868,773 filed Dec. 6, 2006.

FIELD OF THE INVENTION

The present invention relates generally to memory systems. More particularly, the present invention relates to apparatus and method for producing device identifiers for a serial interconnection configuration of devices of mixed type.

BACKGROUND OF THE INVENTION

Current consumer electronic equipment uses memory devices. For example, mobile electronic devices such as digital cameras, portable digital assistants, portable audio/video players and mobile terminals continue to require mass storage memories, preferably non-volatile memory with ever increasing capacities and speed capabilities. Non-volatile memory and hard disk drives are preferred since data is retained in the absence of power, thus extending battery life.

While existing memory devices operate at speeds sufficient for many current consumer electronic devices, such memory devices may not be adequate for use in future electronic devices and other devices where high data rates are desired. For example, a mobile multimedia device that records high definition moving pictures is likely to require a memory module with a greater programming throughput than one with current memory technology. While such a solution appears to be straightforward, there is a problem with signal quality at such high frequencies, which sets a practical limitation on the operating frequency of the memory. The memory communicates with other components using a set of parallel input/output (I/O) pins, the number of which depends on the desired configuration. The I/O pins receive command instructions and input data and provides output data. This is commonly known as a parallel interface. High speed operation may cause deleterious communication effects such as, for example, cross-talk, signal skew and signal attenuation, which degrade signal quality.

In order to incorporate higher density and faster operation on the system boards, there are two design techniques: serial interconnection and multi-drop configurations. These design techniques may be used to overcome the density issue that determines the cost and operating efficiency of memory swapping between a hard disk and a memory system. However, multi-drop configurations have shortcomings relative to the serial interconnection of memory systems. For example, if the number of multi-drop memory systems increases, as a result of loading effect of each pin, delay time also increases so that the total performance of multi-drop is degraded by the multi-drop connection caused by the wire resistor-capacitor loading and the pin capacitance of the memory device. A serial link in a device such as a memory device may utilize a single pin input that receives all addresses, commands, and data serially. The serial link may provide a serial interconnection configuration to control command bits, address bits, and data bits effectively through the serial interconnection. By providing a serial interconnection configuration, a device identifier is assigned to each of the connected devices.

SUMMARY OF THE INVENTION

In accordance with one aspect of the present invention, there is provided a method for producing a device identifier (ID) for a device, comprising: receiving a device type (DT) and an input ID; determining the DT of a device in response to the received DT; outputting an output ID in accordance with a determination result; and providing the output ID accompanying the received DT to another device, the device and the another device being interconnected to each other.

For example, the step of determining provides device type information (DTI) associated with the device. The received DT is compared with the provided DTI to provide the determination result.

Advantageously, a calculation is performed based on the received ID and an altered ID is outputted. The altered ID or a non-altered ID is selected in response to the determination result. The selected ID is combined with the received DT. The combined ID and DT are provided to the another device interconnected to the device.

The combined DT and ID may be further combined with an ID production command. The combined command, the DT and the ID may be transmitted in a packet basis to the another device.

In accordance with another aspect of the present invention, there is provided an apparatus for use in a device, comprising: a receiver for receiving a device type (DT) and a device identifier (ID); a determiner for determining the DT of a device from the received DT; an ID provider for outputting an ID in accordance with a determination result; and an output provider for providing the outputted ID accompanying the received DT to another device.

For example, in the determiner, device type information (DTI) of the device is provided and the received DT is compared with the provided DTI. The comparison is made by a DT match detector that detects a match between the received DT and the provided DTI. A match determination result is provided when there is a match between the received DT and the provided DTI. When there is a no-match, no match result is provided.

Advantageously, the ID output provider includes an arithmetic operator that performs a calculation of an ID based on the received ID and a value of one. In response to the determination result of a match or a no-match, the calculated ID or a non-calculated (i.e., the received ID) is selected as the new ID The provider may include: an output provider for outputting the provided new ID accompanying the received DT to another device that is interconnected to the device. The device and the other devices are ones of a plurality of serially interconnected devices of mixed type.

For example, the ID accompanying DT may be combined with an ID generation command. The combined ID, DT and command may be provided in a packet that is transmitted to the other device.

In accordance with a further aspect of the present invention, there is provided an apparatus for assigning a device identifier at a first device coupled to a second device in a serial interconnection configuration of memory devices of mixed type, the first device having a serial input connection coupled to a serial output connection of a previous device in the serial interconnection configuration, the second device having a serial input connection coupled to a serial output connection of the first device. The apparatus comprises: a receiver for receiving a device identifier (ID) and a device type (DT), the ID and DT being provided through the serial input connection of the device; a determiner for determining the DT of the device from the received DT; an ID provider for outputting an ID in accordance with a determination result; and an output provider for providing the outputted ID accompanying the received DT to another device.

In accordance with yet a further aspect of the present invention, there is provided a method for assigning a device identifier (ID) for one of a plurality of memory devices of mixed type in a serial interconnection configuration, a first device having a serial input connection coupled to a serial output connection of a previous device, a second device having a serial input connection coupled to a serial output connection of the first device, the method being adopted to at least one of the devices. The method comprises: receiving an input ID and a device type (DT) through the serial input connection of a device; determining the DT of the device from the received DT; outputting an output ID in response to a determination result; and providing a combination of the received DT and the outputted ID.

In accordance with yet a further aspect of the present invention, there is provided a method for assigning a device identifier (ID) for a plurality of memory devices of mixed type in a serial interconnection configuration, a first device having a serial input connection coupled to a serial output connection of a previous device, a second device having a serial input connection coupled to a serial output connection of the first device. The method comprises: receiving a device type (DT) and an input ID through the serial input connection; holding the received DT at a device; determining whether the received DT matches a reference DT associated with the device; obtaining a calculated ID or a non-calculated ID in response to a determination result; combining the received DT with the calculated or non-calculated ID; providing the combined DT and ID through the serial output connection of the device; and performing an ID assignment in response to the determination result at the device.

In accordance with an embodiment, there is provided a plurality of memory devices of mixed type that is serially interconnected. The devices are, for example, random access memories and Flash memories. Each device has device type information on its device type. A memory controller provides an ID generation command, a specific device type (DT) and a device identifier (ID) to a device that determines whether the provided DT matches the device's DT. If there is a match between them, an addition of ID is performed in the device to produce an ID. If there is no DT match, no addition is performed in the device (i.e., the ID production is skipped or bypassed). The added ID (the produced ID) or the fed ID (the non-calculated ID) is selected and the selected ID accompanying the fed DT is transferred to a next device in the serial interconnection configuration. Such a device type match determination and ID production or skip are performed in all devices of the serial interconnection configuration. With reference to a device type provided to the interconnected devices, IDs are sequentially generated. The generated ID and the provided DT and the ID generation command are combined and the combined data is transmitted as a packet.

In accordance with an embodiment, there is provided an ID generation with skip function for serially interconnected memory devices of mixed type, in accordance with the device types. The device type number, the ID number and an ID generation command are transferred as a packet. The devices may include random access memories such as DRAMs, SRAMs, MRAMs and Flash memories such as NAND-, NOR- and AND-types.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein:

FIG. 2A is a timing diagram of single data rate operation of memory devices;

FIG. 2B is a timing diagram of double data rate operation of memory devices;

FIG. 3 is a timing diagram illustrating signals and packets propagated through the interconnected devices shown in FIG. 1;

FIG. 9A is a block diagram illustrating the plurality of devices in the serial interconnection configuration shown in FIG. 6A, in which the ID generation of NOR memory devices is performed;

DETAILED DESCRIPTION

Figure 1:
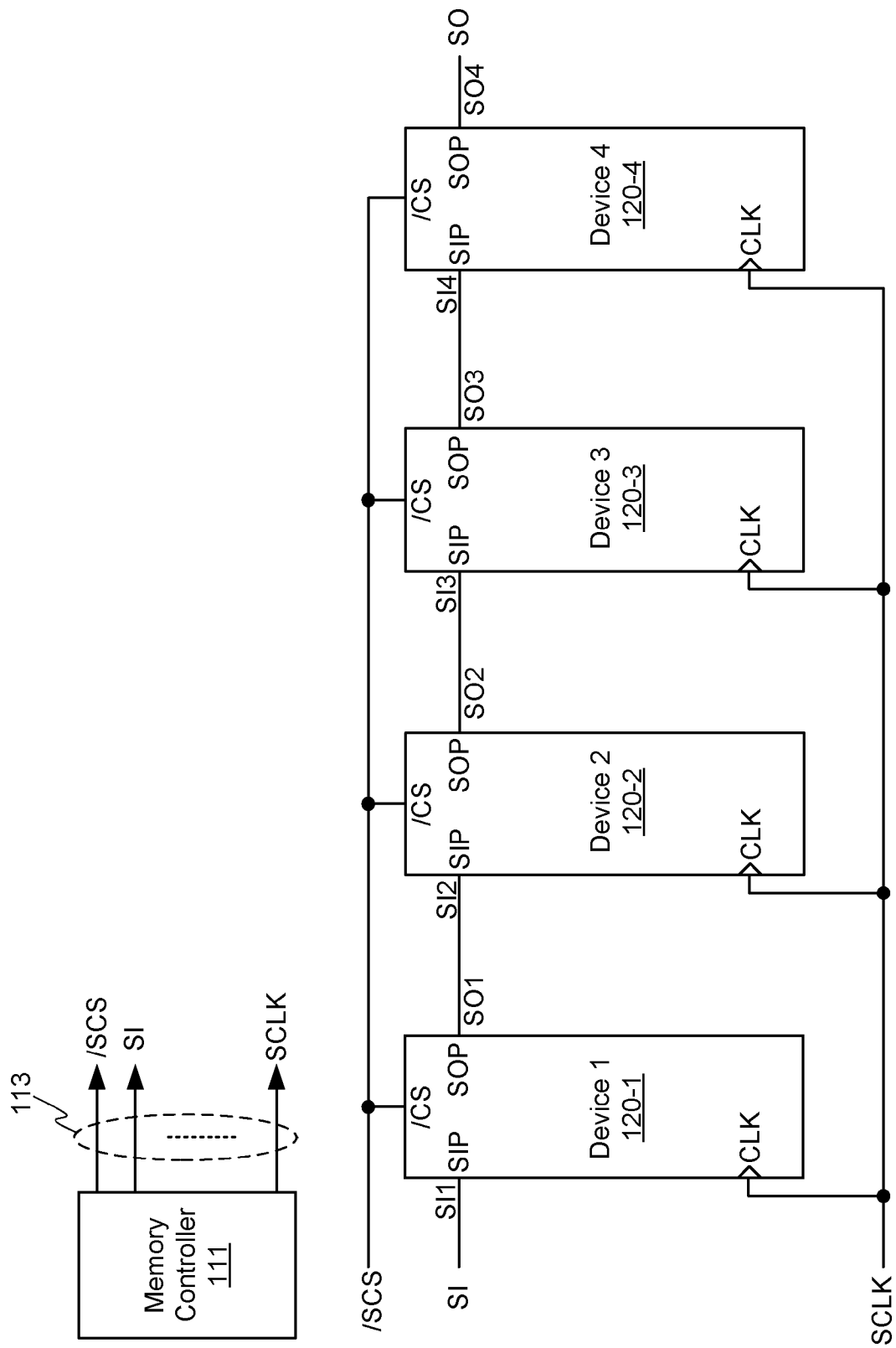
FIG. 1 is a block diagram illustrating a memory system including a plurality of memory devices in a serial interconnection configuration to which embodiments of the present invention are applied.

In the following detailed description of embodiments of the present invention, reference is made to the accompanying drawings which form a part hereof, and in which is shown by way of illustration of embodiments in which the present invention may be practiced. These embodiments are described in sufficient detail to enable those of ordinary skill in the art to practice the present invention, and it is to be understood that other embodiments may be utilized and that logical, electrical, and other changes may be made without departing from the scope of the present invention. The following detailed description is, therefore, not to be taken in a limiting sense, and the scope of the present invention is defined by the appended claims.

Generally, the present invention provides apparatus and method for producing device identifiers in serially interconnected devices.

Some memory subsystems employ multiple memory devices, such as Flash memory devices, with serial interfaces. Here, the command string may be fed to all of the devices even though the command may only be performed on one of the devices. To select the device on which the command is to be performed, the command string may contain a device identifier (ID) or a device address that identifies the memory device to which the command is directed. Each device receiving the command string compares the ID contained in the command string to an ID associated with the device. If the two match, the device will assumes that the command is directed to the device to execute the command.

The above-described arrangement needs to assign an ID for each device. One technique that may be used to assign an ID for a device is to hardwire an internal unique ID into the device. One drawback with this approach, however, is that if large volumes of devices are used, the size of the ID may have to be quite large in order to ensure that each device contains a unique ID. Managing a large-sized ID may add significant complexity to the device, which in turn may increase the cost of producing the device. In addition, reclaiming IDs that are associated with devices that are no longer in use may further add to the complexity of this scheme.

Another approach to assigning IDs to devices involves externally hardwiring an ID for each device. Here, the ID may be specified by wiring various pins on the device to certain states to assign an ID for the device. The device reads the wired state of the pins and assigns its ID from the read state. One drawback with this approach, however, is that external wiring is needed to assign the ID for each device. This may add to the complexity of, e.g., printed circuit boards (PCBs) that hold the memory devices. Another drawback with this approach is that it may require pins to be dedicated for the assignment of the ID. This may consume precious resources that may be otherwise better used. In addition, dedicating pins for the assignment of the ID may require a greater footprint for the device than if pins were not used to assign the ID.

At least some of embodiments of the present invention address at least some of these shortcomings. At least some example embodiments automatically assign an ID for a device, for example, in a serial interconnection configuration, in a manner that does not require special internal or external hardwiring of the ID. According to an aspect of the techniques described herein, an input signal is transferred to a first device in an arrangement including multiple devices (e.g., a serial interconnection configuration) using inputs that are also used by the first device to input other information to the device (e.g., data, commands, control signals). A generator generates an ID in response to the input signal. A transmitter transfers an output signal associated with the ID to a second device through a serial output of the first device. The serial output may also be used by the first device to output other information (e.g., signals, data) to another device in the configuration.

In an embodiment of the techniques described herein, a write ID operation is initiated at a device in a serial interconnection configuration of memory devices of mixed type to cause the device to produce an ID. A first device receives information on a device type (DT) and a first value by acquiring the state of one or more inputs of the first device. If the received DT matches the device type of the first device, it will generate an ID from the first value, which may include placing the first value in storage (e.g., an ID register) associated with the device. The first device generates a second value from the acquired state. The first device outputs a second value via an output of the first device to a second device in the serial interconnection configuration. The second device inputs the value output by the first device and repeats this process to generate an ID.

Embodiments of the present invention will now be described in conjunction with the ID generation in a packet basis wherein during an ID generation operation, an ID generation command is serially transferred through the serial interconnection of devices. A device receives serial packet basis commands at the serial input thereof in response to clocks and interprets them for ID generation. A packet based ID generation is disclosed in U.S. patent application Ser. No. 11/529,293 filed Sep. 29, 2006 entitled "Packet Based ID Generation for Serially Interconnected Devices", the content of which is entirely incorporated herein by reference.

FIG. 1 shows a system that includes memory devices employing a serial interconnection configuration to which embodiments of the present invention are applied. The serial interconnection configuration includes a plurality of single port devices, which has inputs and outputs for various information or data. In this example, four memory devices 1, 2, 3 and 4 (120-1, 120-2, 120-3 and 120-4) are serially interconnected. Each of the devices 120-1-120-4 has the same structure. Each device includes a serial input port (SIP) connection, a serial output port (SOP) connection, a chip select input (/CS) and a clock input (CLK). A memory controller 111 provides a group of signals 113 containing information on chip select /SCS, serial input SI, clock SCLK and other control and data information that are provided to the devices. The memory devices may operate with either of a single data rate (SDR) interface or a double data rate (DDR) interface.

FIG. 2A shows a relative timing sequence for an SDR operation of memory devices. FIG. 2A shows operation in one port. Referring to FIGS. 1 and 2A, the operation is that information transferred to the devices 120-1-120-4 can be captured at different times of the clock signal SCLK fed to the CLK inputs of the devices. In an example of the SDR implementation, information fed to one of the devices at its SIP connection can be captured at the rising edge of the clock signal SCLK. In the SDR operation, the chip select signal is commonly connected to enable all devices at the same time, so that input data of the first device is transferable through the serial interconnection configuration. Alternatively, in the SDR operation, information fed to the device at the SIP connection may be captured at the falling edge of the clock signal SCLK.

FIG. 2B shows a relative timing sequence for a DDR operation of memory devices. FIG. 2B shows operation in one port. In the DDR operation, both of the rising and falling edges of the clock signal SCLK can be used to capture information fed to the SIP connection.

In both examples shown in FIGS. 2A and 2B, the chip select signal /SCS is commonly provided the all devices to enable them at the same time, so that in response to the clock signal SCLK, input data fed to the first device may be propagated to the last device in the serial interconnection configuration with or without being altered by the devices thereof.

In the particular example shown in FIG. 1, the system adopts the SDR implementation and the following description is based on the SDR operation.

FIG. 3 shows signals and packets propagated through the devices 120-1-120-4 shown in FIG. 1. Referring to FIGS. 1 and 3, the chip select signal /SCS is first asserted to select the devices. The memory controller 111 sends data and/or information to the devices in the serial interconnection configuration. The data and/or information in the serial input SI is propagated as packets through the interconnected devices with or without being altered by each of the devices. The propagation enables information to be clocked from the SOP connection of device 1, 120-1, to the SIP connection of device 2, 120-2, at one cycle after the information is clocked into device 1, 120-1. This process is repeated for successive devices in the serial interconnection configuration. In the example, the serial input SI1 as a packet to device 1, which is fed by the memory controller 111, contains commands CMD and data or information on a device type DTsi and an initial ID number or value, ID0. Device 1 outputs commands CMD and data on the device type, DTsi, and an altered or non-altered ID from the initial ID0, IDo1, as the serial output SO1 in a packet basis. The serial output SO1 is the serial input SI2 fed to device 2. Device 2 performs the same function of the ID production as that of device 1. Similarly, the successive devices perform the same ID producing function.

Figure 4:
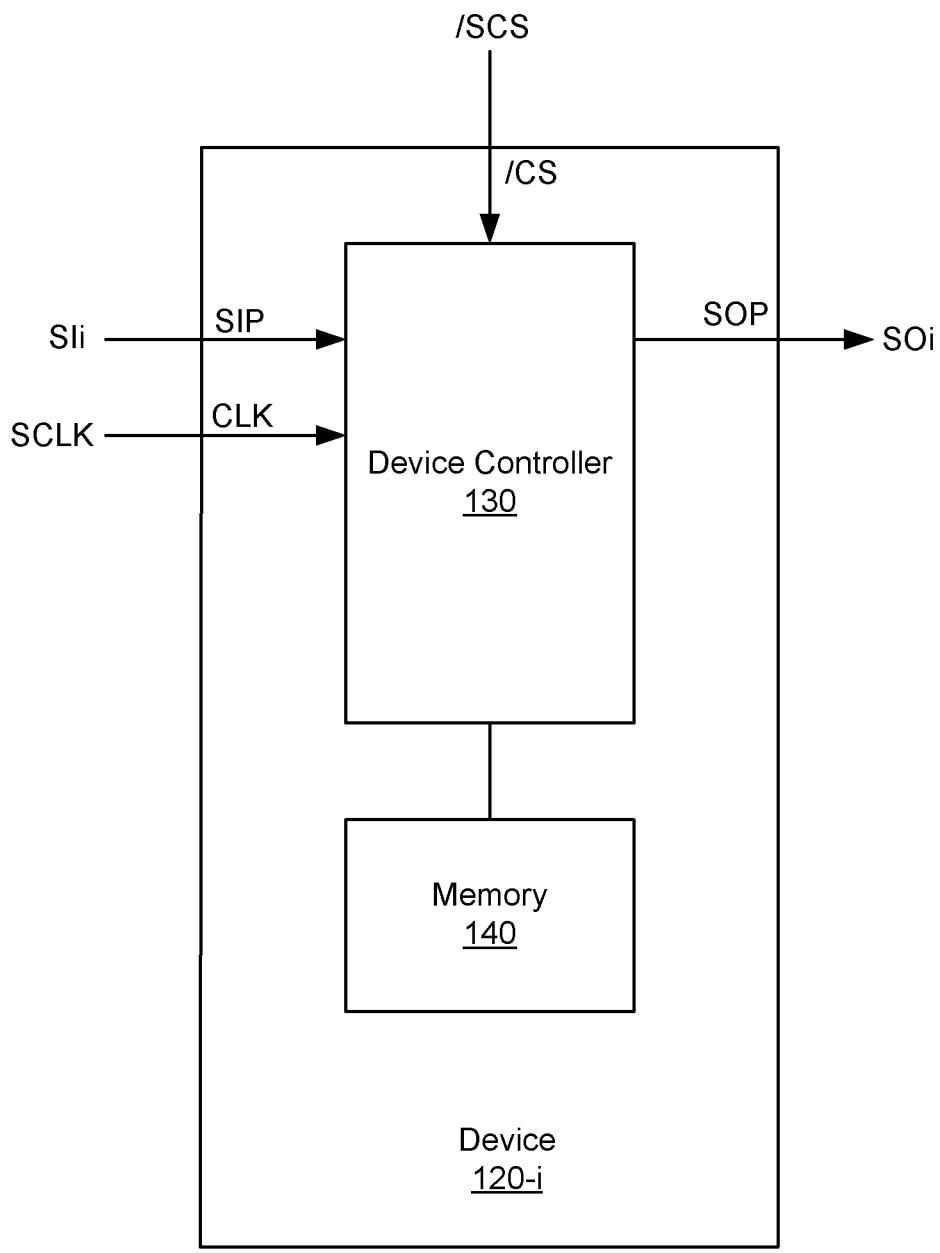
FIG. 4 is a block diagram illustrating one of the devices of FIG. 1.

FIG. 4 shows one device 120-i representing any one of the devices 120-1-120-4 of FIG. 1. Referring to FIGS. 1 and 4, the device 120-i includes a device controller 130 and a memory 140 that is any type of memory, such as random access memory or Flash memory. For example, the random access memories are dynamic random access memory (DRAM), static random access memory (SRAM), magnetoresistive random access memory (MRAM) and the Flash memories are NAND-type, NOR-type, AND-type, and other type Flash memories.

The device 120-i has the SIP connection, the SOP connection, the /CS input and the CLK input. The SIP connection is used to transfer information (e.g., command, address and data information) into the device 120-i. The SOP connection is used to output information from the device 120-i. The CLK input receives the clock signal SCLK. The /CS input receives the chip select signal /SCS, which enables operations at all devices simultaneously. The device controller 130 performs various control and process functions with access to the memory 140 in response to the input signals (e.g., SI, SCLK), and provides serial output data to a next device 120-(i+1).

The SIP and SOP connections are connected between devices, such that the SOP connection of a previous device 120-(i−1) is coupled to the SIP connection of the present device 120-i in the serial interconnection configuration. For example, the SOP connection of device 1, 120-1, is coupled to the SIP connection of device 2, 120-2. The CLK input of each of four devices 120-1-120-4 is fed with the clock signal SCLK from the memory controller 111. The clock signal SCLK is distributed to all devices via a common link. The clock signal SCLK is used to capture information input to the device 120-i at various registers contained therein. The /CS input is a conventional chip select input for selecting the device. The /CS input is coupled to a common link which enables the chip select signal /SCS to be asserted to all of the devices 120-1-120-4 concurrently and consequently selects all of the devices. The SIP and SOP connections of the present device 120-i are coupled with the SOP connection of the previous device 120-(i−1) and the SIP connection of the next device 120-(i+1) in the serial interconnection configuration, as described above.

Figure 5A:
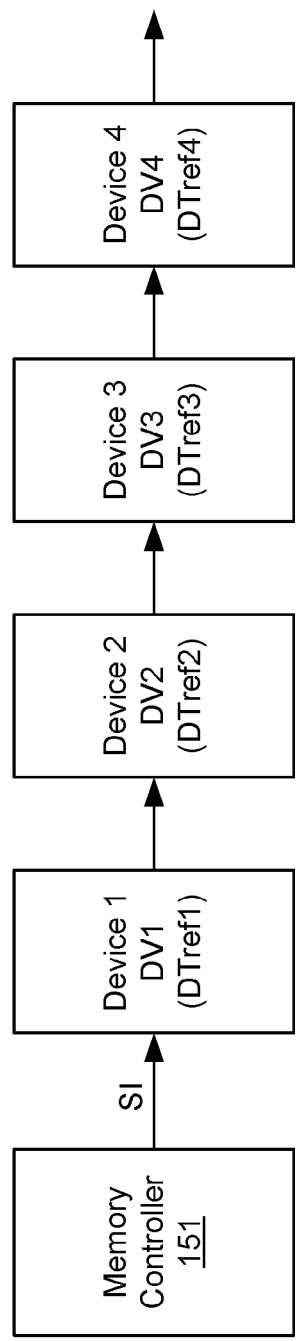
FIG. 5A is a block diagram illustrating a plurality of memory devices in a serial interconnection configuration to which embodiments of the present invention are applied.

FIG. 5A shows a plurality of memory devices in a serial interconnection configuration to which embodiments of the present invention are applied. Referring to FIG. 5A, a memory controller 151 provides a group of signals to an interconnected devices 1-4 that have their own device type information (DTI) as reference device types DTref1-DTref4, respectively. Each of the device types may be the same as or different from another. The signals include a serial input SI containing commands CMD, a device type DTsi and an initial ID, ID0, which is fed to device 1.

Figure 5B:
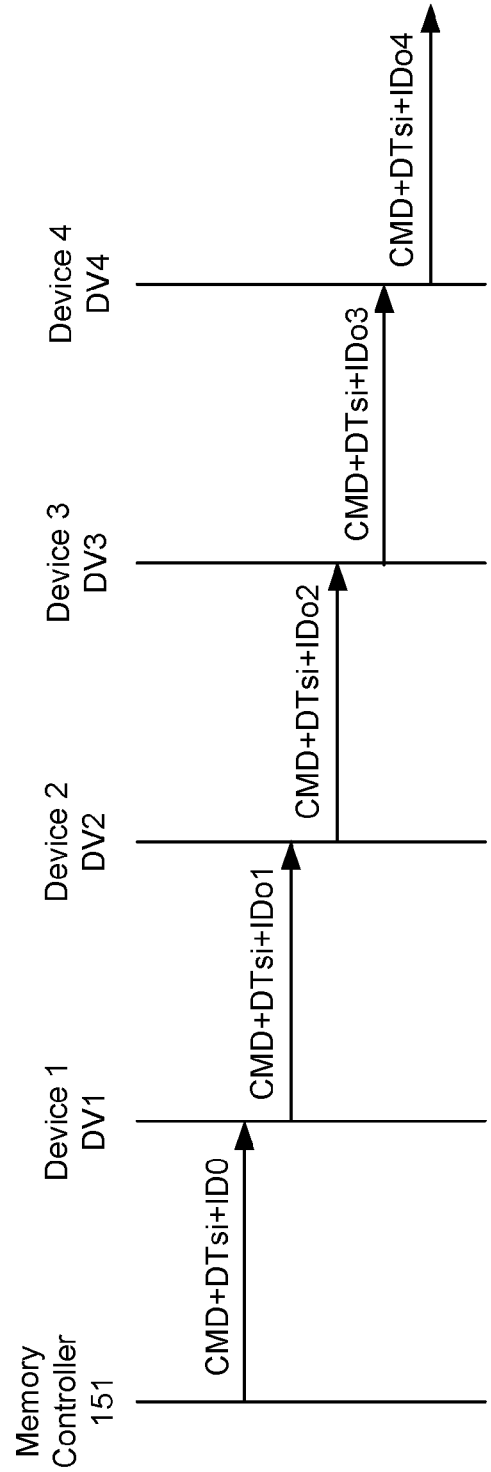
FIG. 5B is a schematic diagram illustrating a protocol conducted in the devices shown in FIG. 5A.

FIG. 5B shows a protocol conducted in the devices shown in FIG. 5A. Referring to FIGS. 5A and 5B, the memory controller 151 sends the commands CMD, the device type DTsi and the initial ID0 as the SI to device 1. Here, the ID generation command IDGC (e.g., eight bits) only is shown as the commands CMD. Device 1 determines whether its device type matches the received device type, DTsi, and outputs an output ID, IDo1, that is altered or non-altered in response to a device type match determination result. The CMD, the DTsi and the IDo1 are sent as the serial output to device 2 that performs the same functions as those of device 1. Similarly, each of the other devices performs the same functions of the DT match determination and the ID generation, in response to the serial input from a previous device as shown in FIG. 5C.

Figure 5C:
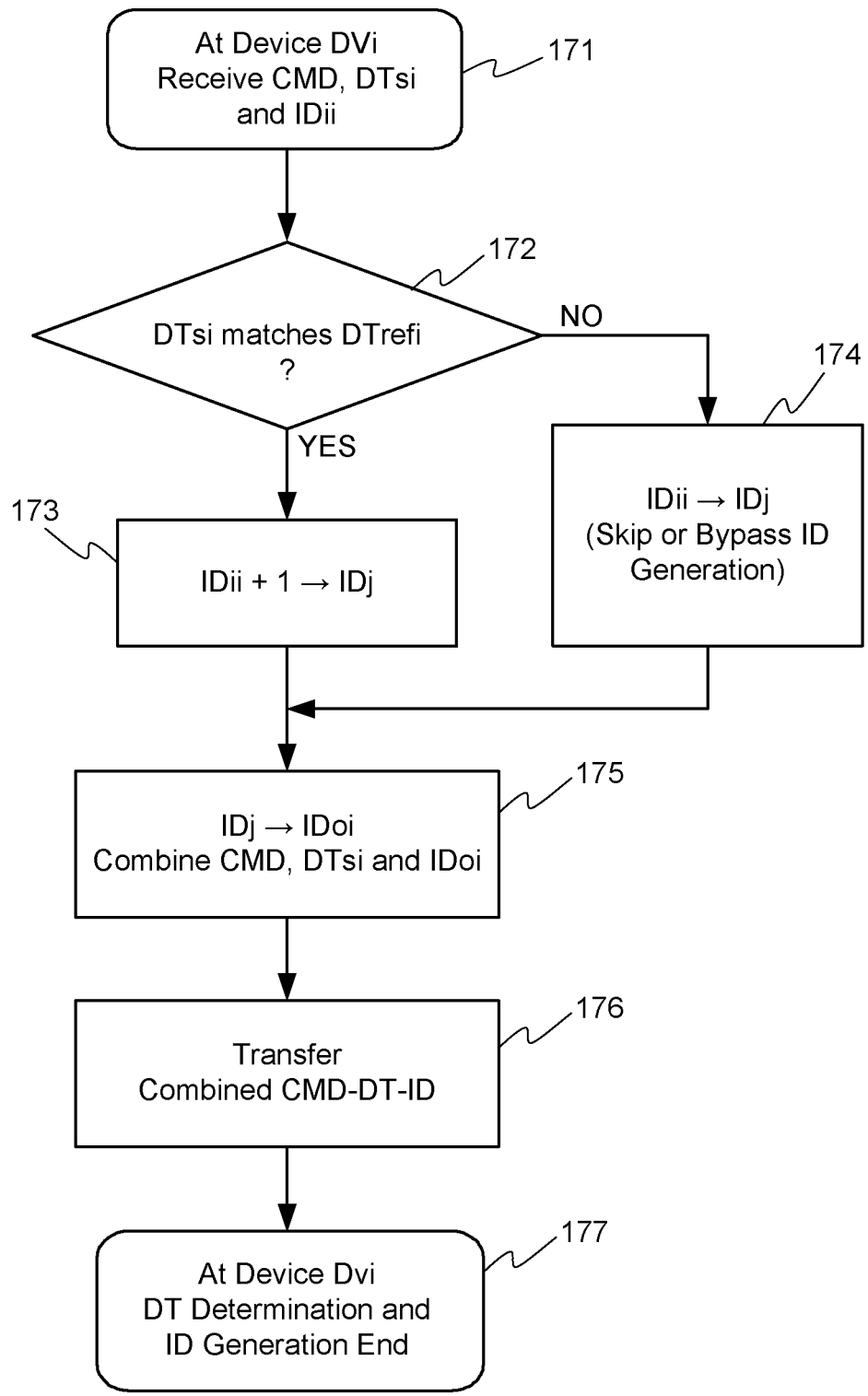
FIG. 5C is a flow chart of an ID assigning method performed by each of the devices shown in FIG. 5B.

Referring to FIGS. 5A-5C, a device DVi receives the commands, the device type information DTsi and the ID information, IDii (step 171) from a previous device DV(i−1) (or the memory controller 151 if the device DVi is device 1). The device type DTsi is device type information originally provided by the memory controller 151 for device type match determination and propagated in the serial interconnection configuration. At the device DVi, the received DTsi is compared to a reference device type DTrefi that is associated with the device DVi (step 172). In the example, the reference DT, DTrefi, is provided by storage means of the device DVi (not shown). If the received DTsi matches the reference DTrefi, the received ID, IDii, will be incremented by one, so that an altered ID (or a +1 ID) is generated as a new ID, IDj, (step 173). If there is no-match between the DTsi and the DTrefi (NO at step 172), the received ID, IDii, will be maintained as a new ID, IDj (step 174). Thus, at step 174, the ID generation is skipped or bypassed. After step 173 or 174, the new IDj is as an output ID, IDoi, combined with the received DTsi and the command CMD (step 175). The combined CMD-DTsi-IDoi is fed by the device DVi as the SOi to a next device DV(i+1) (step 176) and the DT determination and ID generation end at the device DVi (step 177). The device DV(i+1)

receives the IDoi accompanying the DTsi as the SIi and, in response to the SIi containing the CMD, the DTsi and the IDi, performs the device type match determination and ID generation operations. Thus, such operations of the device type match determination and ID generation is performed by all of devices 1-4.

Figure 6A:
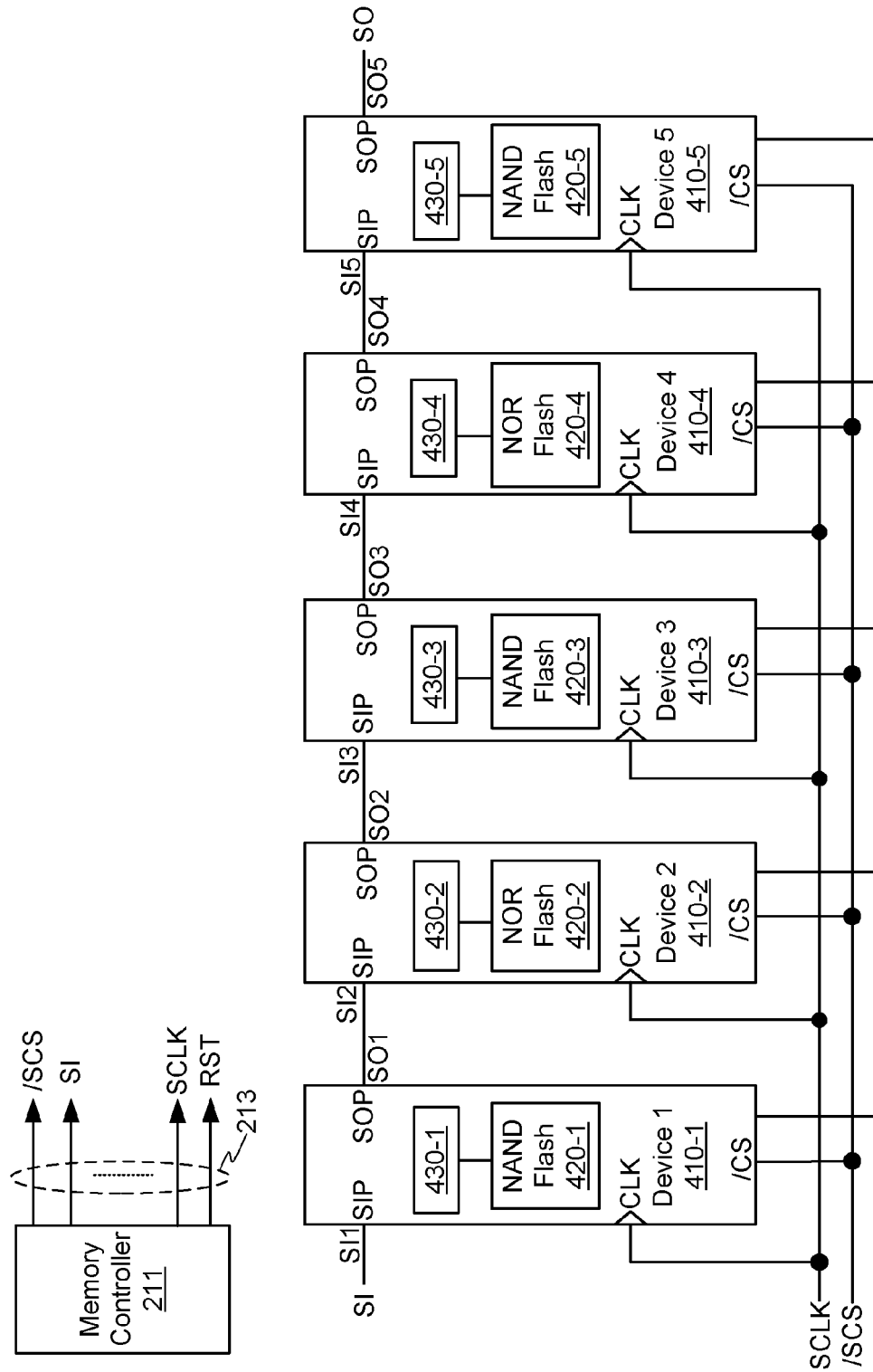
FIG. 6A is a block diagram illustrating a memory system including a plurality of devices of mixed type in a serial interconnection configuration, in which embodiments of the present invention are implemented.

FIG. 6A shows a system including a plurality of devices in a serial interconnection configuration and a memory controller, in which embodiments of the present invention are implemented. The devices' types are mixed and the memory devices included in the interconnection configuration are of any type of memories, such as random access memories (e.g., DRAMs, SRAMs, MRAMs) and the Flash memories (e.g., NAND-type, NOR-type, AND-type, other types). In this particular example shown in FIG. 6A, the serial interconnection configuration includes five memory devices of mixed type, which are three NAND Flash devices and two NOR Flash devices. Referring to FIG. 6A, five devices 1-5 (410-1-410-5) are interconnected and they include memories 420-1-420-5 therein. Each of the memories 420-1, 420-3 and 420-5 is a NAND Flash memory. Each of the memories 420-2 and 420-4 is a NOR Flash memory. For example, a system implementing such an arrangement of different type or a mixed-device serial interconnection may require that only devices of a certain type (e.g., NAND Flash devices) be assigned IDs. Alternatively, the system may require that all devices be assigned IDs, but that all devices of the same type be assigned IDs in a consecutive sequence. In order to meet such requirements in a system implementing ID generation as described above, devices 1-5, 410-1-410-5, are provided with device controllers 430-1-430-5, respectively. One of functions performed by the device controller is to assign an ID based on the device type.

A memory controller 211 provides a group of signals 213 containing information on the chip select /SCS, serial input SI, clock SCLK, reset RST and other control and data information. In the particular example shown in FIG. 6A, the chip select signal /SCS, the clock signal SCLK and the reset signal RST are commonly fed to all devices. The serial input SI1 is provided to device 1, 410-1, and device 1 outputs a serial output SO1 to a next device, i.e., device 2, 410-2. Each of the devices performs similar functions and thus, the serial input SI is propagated through the interconnected devices with or without being altered. The serial input SI to and the serial output SO from each device transmitted as packets.

The serial interconnection configuration shown in FIG. 6A includes NAND and NOR Flash devices only. It is noted that the interconnection configuration can include another type of memory devices, e.g., AND-type, DRAM, SRAM devices.

Figure 6B:
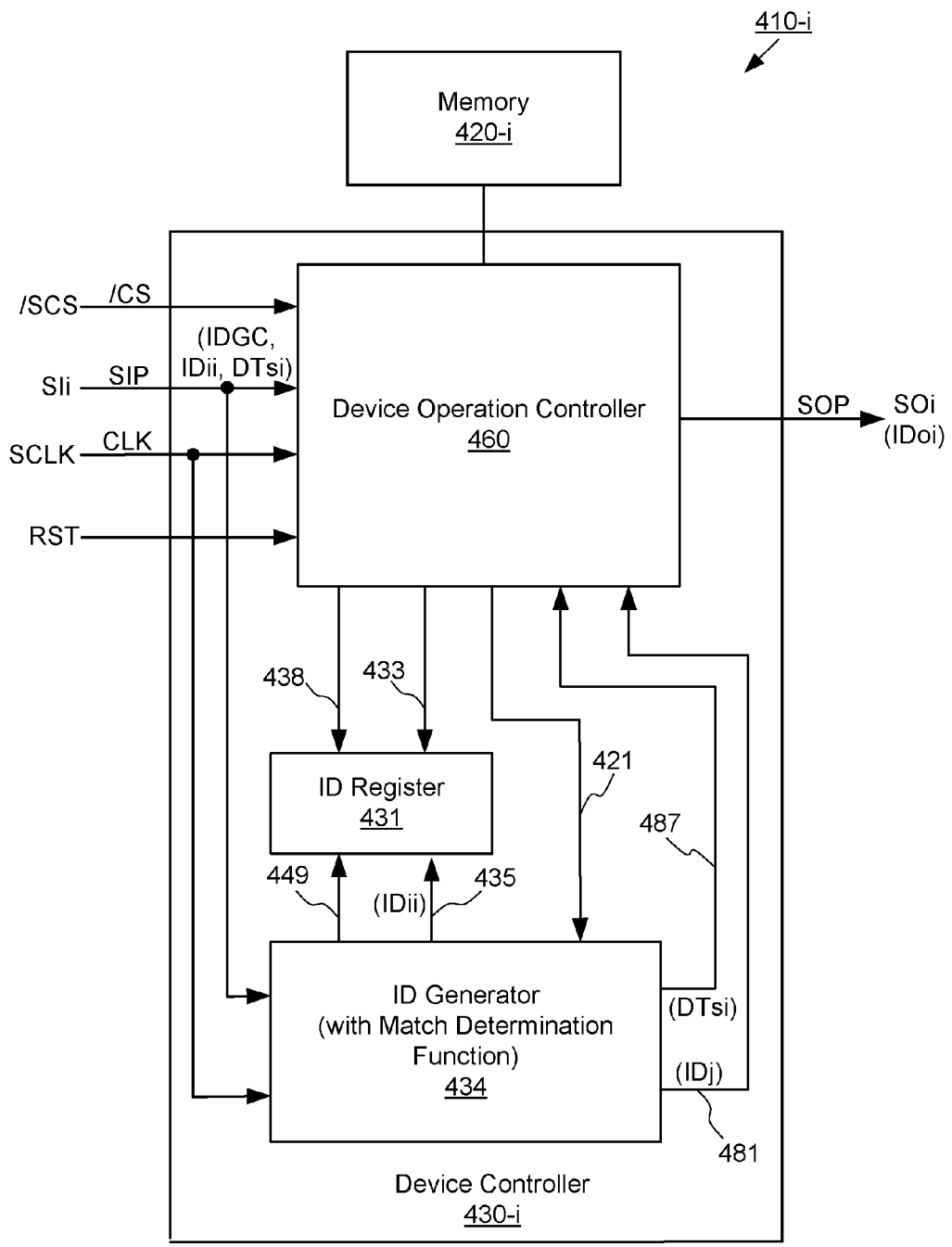
FIG. 6B is a block diagram illustrating one of the devices shown in FIG. 6A.

FIG. 6B shows details of a device 410-$i$ which represents the devices 410-1-410-5 shown in FIG. 6A. Referring to FIG. 6B, the device 410-$i$ includes a memory 420-$i$ and a device controller 430-$i$ connected thereto. The device controller 430-$i$ includes a device operation controller 460, an ID generator 434 and an ID register 431. The device operation controller 460 receives the chip select signal /SCS, the clock signal SCLK, the serial input signal SIi and the reset signal RST and performs the functions of control and data processing. The serial input signal SIi fed to the SIP connection of the device 410-$i$ contains the commands and other signal data. In the example, the commands include an ID generation command IDGC of p-bits (e.g., p being eight). The SIi signal includes a device type DTsi and a device identifier IDii. The serial input SI includes other commands CMD, but are not shown. In response to the ID generation command IDGC, the device operation controller 460 provides a DT determination control signal 421 to the ID generator 434 that determines whether a received device type matches a pre-defined device type. The received device type is the device type DTsi contained in the serial input SIi. The pre-defined device type is a reference DT, DTref, that is associated with the device 410-$i$. In the example, the reference DT, DTref, is provided by storage means (not shown) of the device 410-$i$.

The ID generator 434 generates an ID, IDj, based on the received ID, IDii, to produce an ID for an ID assignment, in response to the determination result. The produced ID is output through the device operation controller 460 to a next device 410-($i$+1).

Figure 6C:
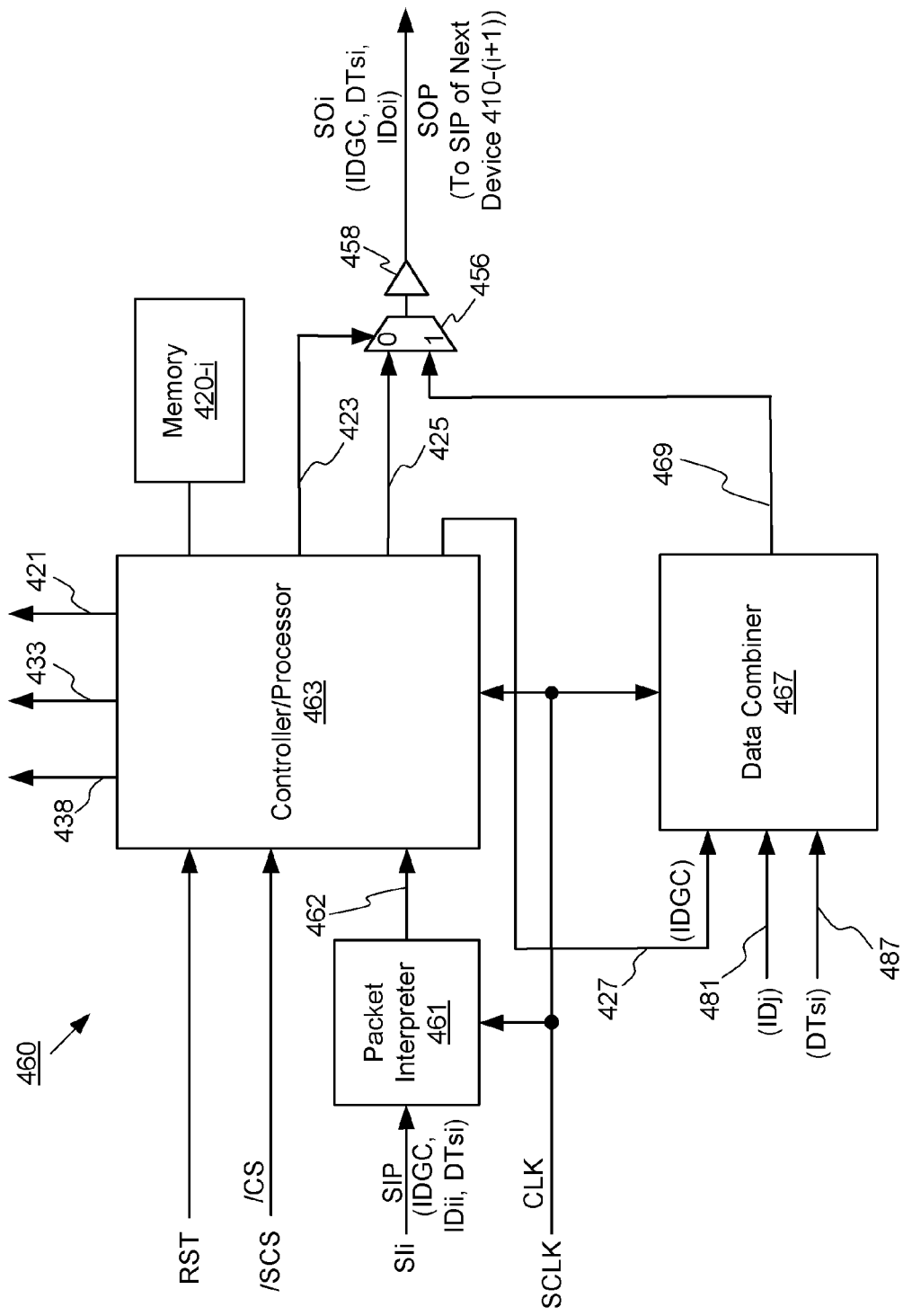
FIG. 6C is a block diagram illustrating an example of a device operation controller of FIG. 6B.

FIG. 6C shows details of the device operation controller 460 of FIG. 6B. Referring to FIGS. 6B and 6C, the device operation controller 460 includes a packet interpreter 461 that receives the serial input signal SIi and the clock signal SCLK. The packet interpreter 461 interprets the commands and provides an interpreted command signal 462 to a controller/processor 463 that receives the chip select signal /SCS, the clock signal SCLK and the reset signal RST. The controller/processor 463 provides the DT determination control signal 421 to the ID generator 434 and an ID write enable signal 433 and an internal reset signal 438 to the ID register 431. The Controller/processor 463 accesses the memory 420-$i$ and provides a processed data signal 425 to a selector 456.

In response to the interpreted command signal 462, the controller/processor 463 provides a command signal 427 containing a code of the ID generation command IDGC to a data combiner 467 and a data selection signal 423 to a selector 456. The IDGC is p-bit serial data. The controller/processor 463 receives the clock signal SCLK, a serial output ID signal 481 containing the n-bit ID and a serial output DT signal 487 containing the m-bit DT. The data combiner 467 combines the ID generation command IDGC, the device type DTsi and the ID, IDj. The data combiner 467 provides a data combination signal 469 containing a combined IDGC-DT-ID to the selector 456. The selector 456 also receives the processed data signal 425 provided by the controller/processor 463 accessing the memory 420 (NAND or NOR Flash memory) of that device 410-$i$. In response to the data selection signal 423 provided by the controller/processor 463, the selector 456 selects one of the combined IDGC-DT-ID and the processed data. A selected data is provided through a buffer 458 to the next device 410-($i$+1).

Figure 6D:
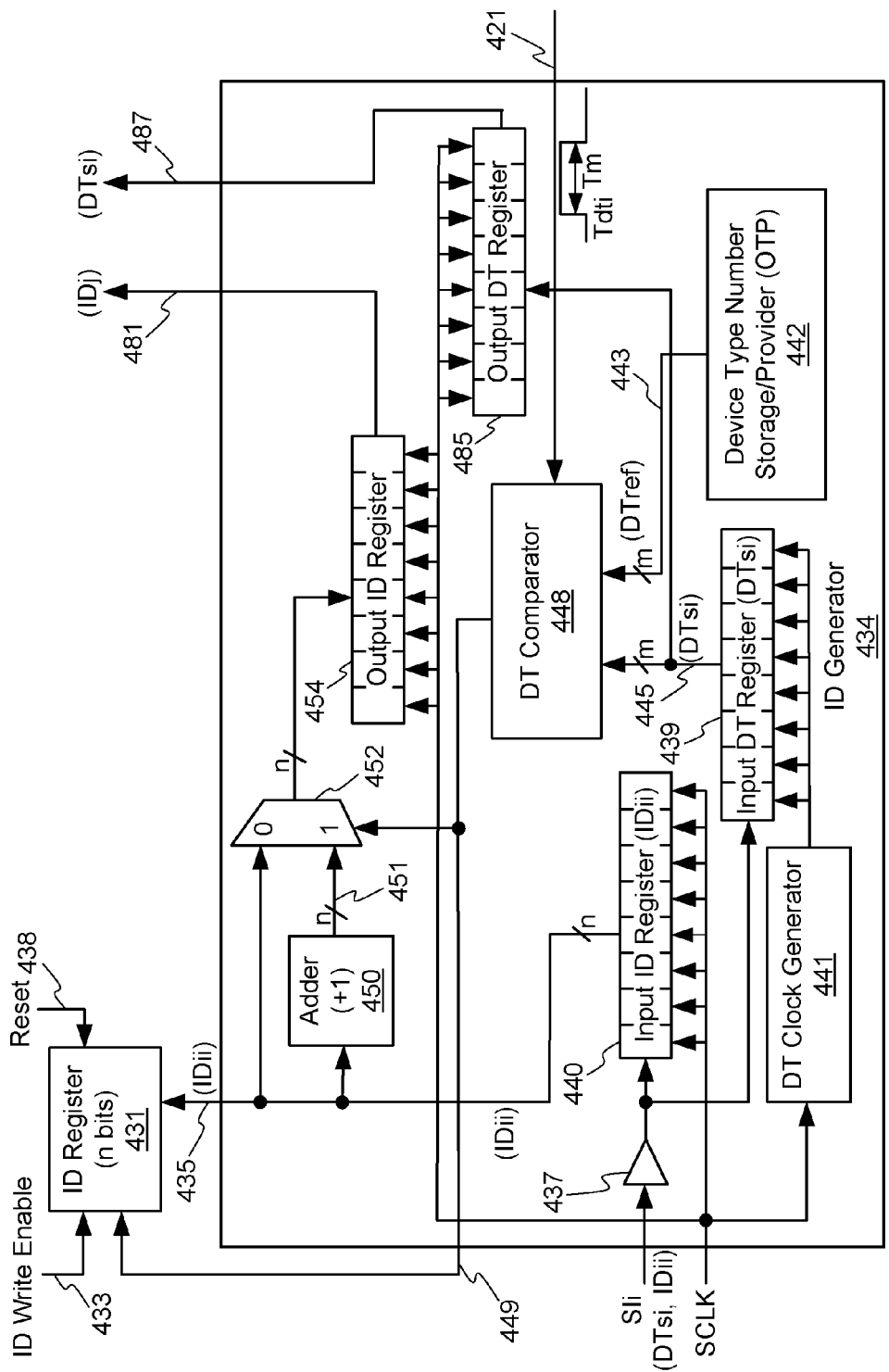
FIG. 6D is a block diagram illustrating an example of an ID generator of FIG. 6B.

FIG. 6D shows details of the ID generator 434 shown in FIG. 6B. Referring to FIGS. 6A-6D, the ID generator 434 includes a device type number storage/provider 442 of a one-time-programmable (OTP) element configured by a non-volatile memory. The OTP element stores a device type number as a device type reference (DTref) that is programmed to the device prior to ID generation. Table 1 shows an example of the definition of device types in serialized byte code.

TABLE 1

| Device Type | HEX | Bit 7 | Bit 6 | Bit 5 | Bit 4 | Bit 3 | Bit 2 | Bit 1 | Bit 0 |
| --- | --- | --- | --- | --- | --- | --- | --- | --- | --- |
| NAND Flash (DTnd) | 00h | 0 | 0 | 0 | 0 | 0 | 0 | 0 | 0 |
| NOR Flash (DTnr) | 01h | 0 | 0 | 0 | 0 | 0 | 0 | 0 | 1 |
| DRAM (DTdm) | 02h | 0 | 0 | 0 | 0 | 0 | 0 | 1 | 0 |
| SRAM (DTsm) | 03h | 0 | 0 | 0 | 0 | 0 | 0 | 1 | 1 |
| — | — | — | — | — | — | — | — | — | — |
| — | — | — | — | — | — | — | — | — | — |

TABLE 1-continued

| Device Type | HEX | Bit 7 | Bit 6 | Bit 5 | Bit 4 | Bit 3 | Bit 2 | Bit 1 | Bit 0 |
|---|---|---|---|---|---|---|---|---|---|
| MRAM (DTmm) | FFh | 1 | 1 | 1 | 1 | 1 | 1 | 1 | 1 |

The definitions of the device types in Table 1 can be changed. More device types can be added.

The ID generator 434 also includes a serial input buffer 437 for receiving the serial input SIi through the SIP connection of the device 410-$i$. The received SIi signal includes a value corresponding to a device type (DT), DTsi, which is a number of m-bits (e.g., eight bits). The received SIi signal also includes a value corresponding to an ID, IDii, which is a number of n-bits (e.g., eight bits). The clock signal SCLK is fed to an input ID register 440 and a device type (DT) clock generator 441 that generates a DT register clock signal internally in response to the clock signal SCLK to provide it to an input DT register 439. Each of the input ID register 440 and the input DT register 439 is a serial-to-parallel register that registers the input serial data therein in response to the input clocks. The m-bit DTsi is serially shifted into the input DT register 439 in response to the DT register clock signal and held therein. The n-bit IDii is serially shifted into the input ID register 440 in response to the clock signal SCLK and held therein.

The m-bit DTsi and n-bit IDii separately held in the input DT register 439 and input ID register 440 are outputted in parallel as an m-bit DT signal 445 and an n-bit ID signal 435, respectively. The ID signal 435 is fed to a selector 452 and an adder 450 that provides a calculation signal 451 having a +1 operation value. The DT signal 445 is fed to a DT comparator 448 of m-bits that also receives an m-bit DT number, DTref, contained in a reference DT signal 443 from the DT number storage/provider 442. In response to the DT determination control signal 421, at determination time Tdti, the DT comparator 448 compares the received DTsi to the reference DT, DTref, to provide a DT match signal 449. If the DTsi and the DTref are identical, the DT match signal 449 will become "high," indicating a match between the two numbers of the device types DTsi, DTref. Otherwise, the DT match signal 449 will be "low," indicating that the received DTsi specifies a type of device that is different from that of the present device 410-$i$ (i.e., no-match). The DT comparator 448 outputs the "high" DT match signal having a pulse width Tm, when a device type match occurs. The time period Tm is selected as that the +1 operation is completed and the addition result is transferred to an output ID register (a parallel-to-serial register) 454. The DT match signal 449 transits "low" in response to the trailing and falling edge of the DT determination control signal 421. The adder 450 adds "1" to the IDii, thereby generating the calculation signal 451 containing an ID, IDii+1, for another device, in a sequence of IDs in the serial interconnection configuration. The adder 450 provides an appropriate function for ID generation when the selected sequence of ID numbers are consecutive integers from low to high.

Alternatively, the sequence of ID numbers could be any other numeral sequence, provided that the adder 450 is replaced with an alternative operator that enables the sequence. For example, the adder 450 could be replaced with a subtractor that subtracts "1" from the ID, IDii, thereby enabling a sequence of consecutive integers from high to low. It will be described later with reference to FIG. 11.

The selector 452 selects one of the two inputs (effectively "added (or altered) ID, IDii+1" and "non-added (or non-altered) ID, IDii") according to the DT match signal 449. If the DT match signal 449 is "high" (corresponding to a match between DTsi and DTref), then the selector 452 will select input "1", which receives the calculation signal 451 of "added IDii+1" from the adder 450. If the DT match signal 449 is "low" (corresponding to a difference between DTsi and DTref), then the selector 452 will select input "0", which receives the ID signal 435 of "non-added IDii" from the input ID register 440. The selected output signal of n-bits from the selector 452 is fed to the output ID register 454 that is enabled to register the selected n-bit ID data (IDj) therein immediately before the expiration of the time period Tm, in response to an enable signal (not shown). The output ID register 454 outputs the registered data in a serial manner as the serial output ID signal 481 that is fed to the data combiner 467.

The DT signal 445 containing the m-bit device type DTsi is fed from the input DT register 439 to an output DT register 485 (a parallel-to-serial register) that provides the serial output DT signal 487 to the data combiner 467 in response to the clock signal SCLK. The data combiner 467 combines the p-bit IDGC, the m-bit DT, DTsi, and the n-bit ID, Do, all of them being serial data. The combined data signal (the data combination signal 469) is fed from the data combiner 467 to the selector 456. The selector 456 also receives the processed data signal 425 provided by the controller/processor 463 accessing the memory 420-$i$ (NAND or NOR Flash memory) of that device 410-$i$. In response to the data selection signal 423 provided by the controller/processor 463, the selector 456 selects one of the data combination signal 469 containing the IDGC-DT-ID and the processed data signal 425. When the data selection signal 423 is "high" (an ID generation mode), the selector 456 selects the data combination signal 469 fed to its "1" input. When the data selection signal 423 is "low" (the normal mode), the selector 456 selects the processed data signal 425 fed to its "0" input. A selected signal from the selector 456 is outputted through the serial output buffer 458 to the next device 410-($i$+1) in the serial interconnection configuration. Thus, in the ID generation mode, the serial output SOi outputted through the SOP connection of the device 410-$i$ contains the ID generation command IDGC, the device type DTsi and the output IDo. The SOi is provided to the next device 410-($i$+1).

It is noted that the aforementioned selector 452 is shown for selecting a single bit of IDii or a single bit of IDii+1. Accordingly, there are n duplicate selectors to select the n-bit calculation signal 451 or the n-bit ID signal 435 and output the selected n-bit signal, in response to the DT match signal 449.

The ID generator 434 provides the ID signal 435 containing the n-bit ID, IDii, to the ID register 431. In response to the ID write enable signal 433 from the device operation controller 460, the ID register 431 registers or latches the received ID, IDii, for the present device 410-$i$. The registered ID is held until powered-off. The ID register 431 is initially reset to the zero state and thus, if no ID latch occurs, the ID register 431 will hold the zero state.

With reference to FIG. 6A, for example, the above ID generation process is completed by device 1's controller 430-1 at device 410-1 that is a NAND Flash memory device. The device controller 430-1 outputs the resulting ID to device 2, 410-2, that is a NOR Flash memory device. The device controller 430-2 located at device 410-2 performs the same operation as the controller 430-1 of device 1, transferring the resulting ID to device 3, 410-3. This process is repeated for all devices 410-1-410-5 in the serial interconnection configuration, until the ID has propagated through all devices.

Figure 7A:
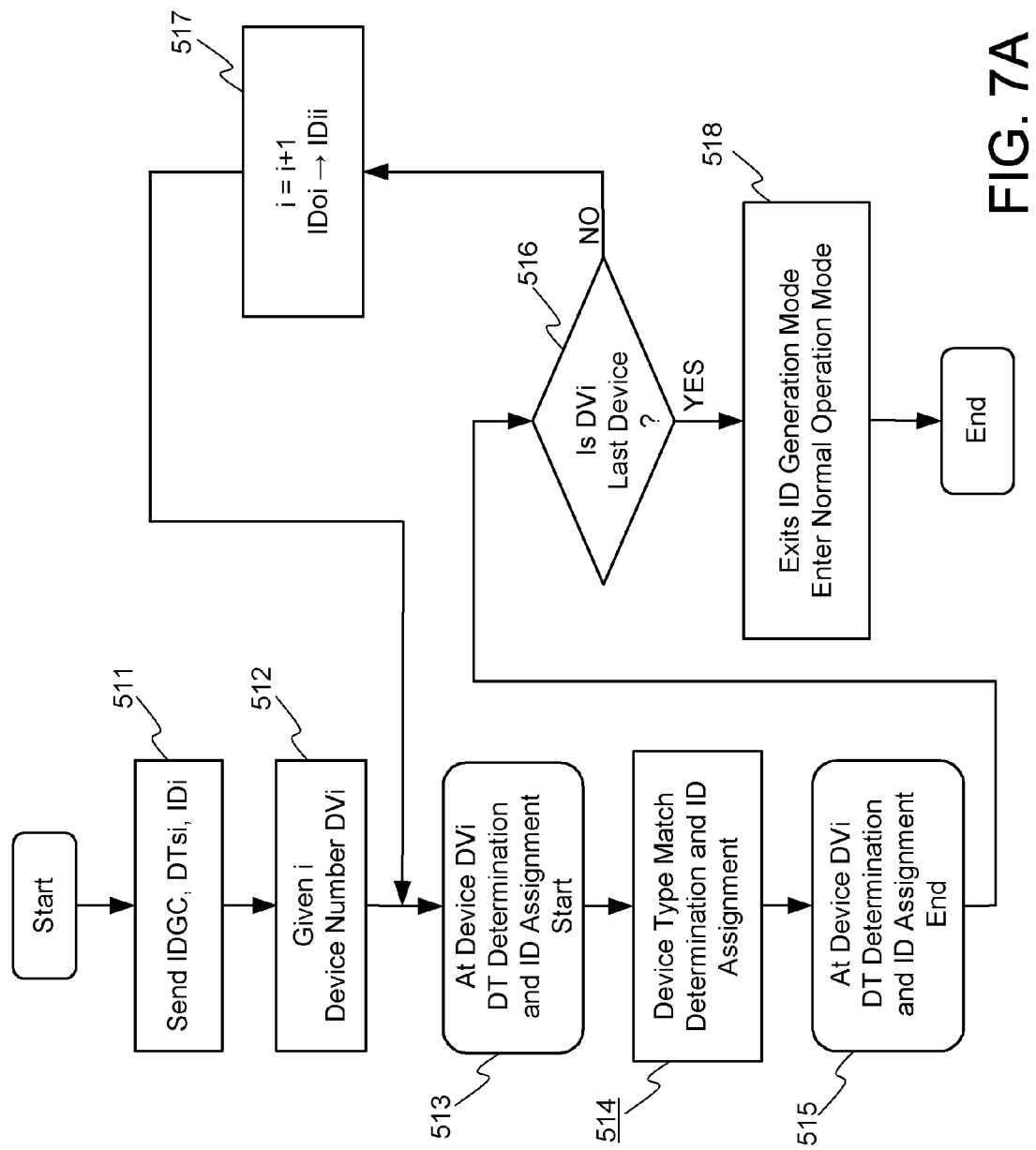
FIG. 7A is a flow chart of operation performed by the serial interconnection configuration of FIG. 6A.

FIG. 7A shows an ID generation method with a skip or bypass function performed by the ID generator of FIG. 6D. Referring to FIG. 7A, a device DVi receives an ID generation command IDGC, a device type DT and an ID (step 511). In the example, "DVi" represents a given device to perform the operations of device type match determination and ID assignment. First to consider the operation of device 1, a device parameter "i" is determined to be "1" (step 512). Then, operation starts at a present device DVi (step 513). The operations of DT match determination and ID assignment are performed at the device DVi (step 514). Upon completion of the operation at step 514, the DT determination and ID generation operations end at the device DVi (step 515). If the device DVi is not the last device (NO at step 516), a given device DVi will be a next device DV(i+1) (i.e., the device parameter i is incremented to "i=i+1"). In this case, the serial output SOi from the present device DVi is the serial input SI to the next device DV(i+1) (step 517). At the next device, the same process is repeated (steps 513-515). As the same process is repeated until the last device completes it (YES at step 516), all of devices 1-5 in the serial interconnection configuration performs the operations of the device type match determination and the ID assignment. After the operation is performed at the last device (YES at step 516), operations will be performed in the normal operation mode (step 518). In this particular example shown in the figures, it is assumed that the memory controller 211 is aware when the last device completes the DT determination and ID assignment operations to move to the normal operation mode. In step 514, if there is a device type match between the received DT and a device type of the device DVi, an ID assignment and an ID generation for another device will be performed. If there is no-match, neither ID assignment nor ID generation for another device will be performed. Details of the operation of DT match determination and ID assignment performed at step 514 are shown in FIG. 7B.

Figure 7B:
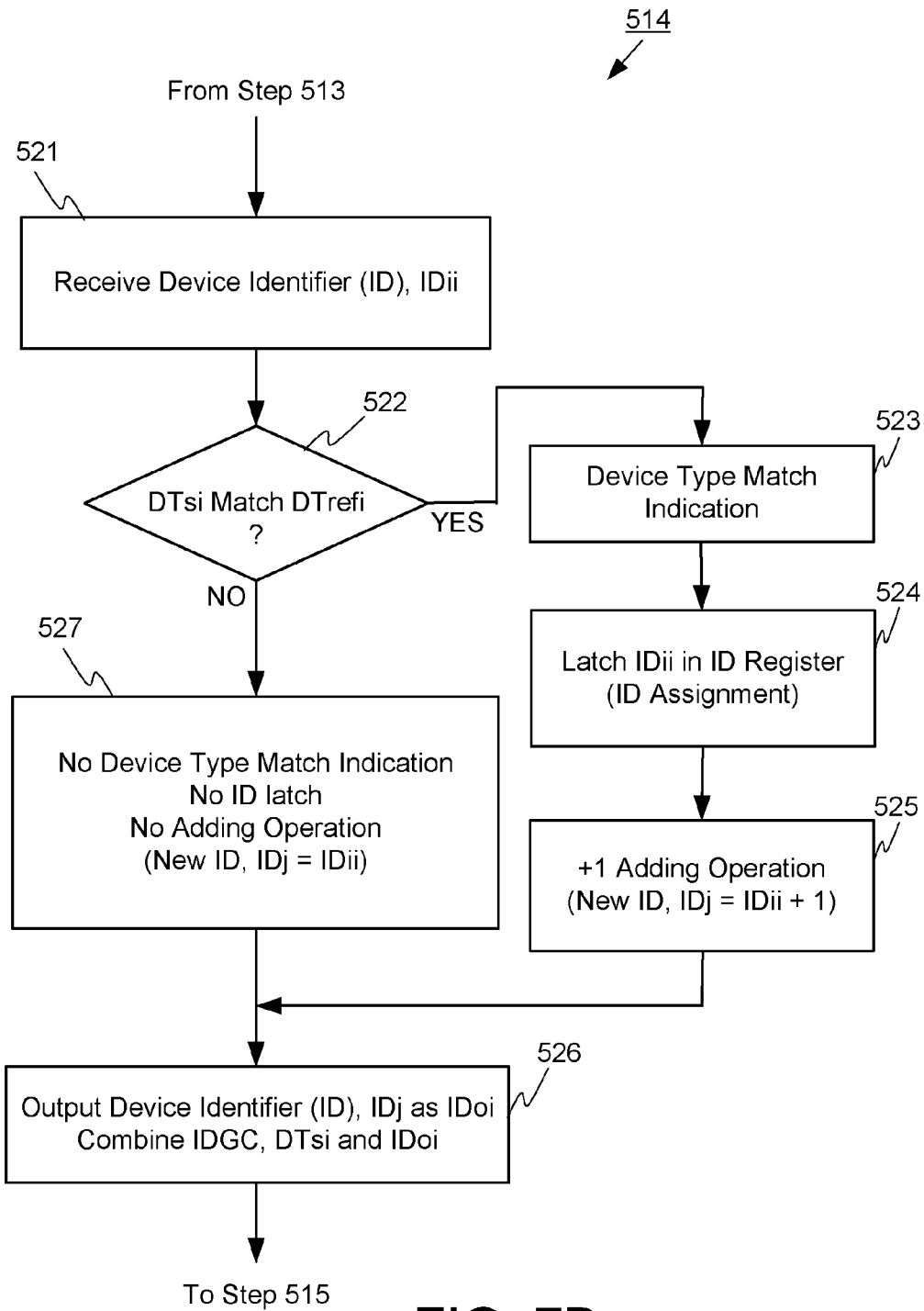
FIG. 7B is a flow chart of part of the operation shown in FIG. 7A.

Referring to FIGS. 6D, 7A and 7B, in the example, a device DVi is given and then, the operations of DT match determination and ID assignment process start at the present device DVi (step 513). The device DVi (e.g., device 2) receives, from a previous device DV(i−1) (e.g., device 1), an ID, IDii, and the received ID is held in the input ID register 440. Also, the device type DTsi for the device type match determination is received and is held in the input DT register 439 (step 521). Then, the held DTsi is compared with the reference DT, DTrefi, by the DT comparator 448 whether there is a match between them (step 522). If there is a match between DTsi and DTrefi (YES at step 522), the DT match signal 449 is "high" to indicate the generation of a new ID and the ID assignment (step 523). In response to the DT match signal 449 being "high", the n-bit IDii contained in the ID signal 435 is registered or latched in the ID register 431 that has been enabled by the ID write enable signal 433. Thus, the received ID, IDii, is assigned to the present device DVi as an ID (step 524). Upon completion of step 524, the ID number or value is then altered by a "+1" operation (step 525) by the adder 450 and the altered or calculated ID is selected by the selector 452, resulting in a new ID, IDj.

If the values of the DTsi and the DTref do not match (NO at step 522), the DT match signal 449 will be "low". This signal indicates to the device not to latch the received ID number, IDii, with no adding operation. Thus, the received ID, IDii, is selected by the selector 452 and is kept as a new ID, IDj. (step 527).

After such a new ID is determined (step 525 or 527), the new ID, IDj, is fed from the selector 452 to the output ID register 454. The serial ID read from the ID register 454 is provided as an output IDoi contained in the output ID signal 481 to the data combiner 467. The IDoi is combined with the serial DTsi read from the output DT register 485 and further combined with the ID generation command IDGC by the data combiner 467. The resultant combination of IDGC, DTsi and IDoi is transferred to the next device DV(i+1) in the serial interconnection configuration (step 526).

Figure 8A:
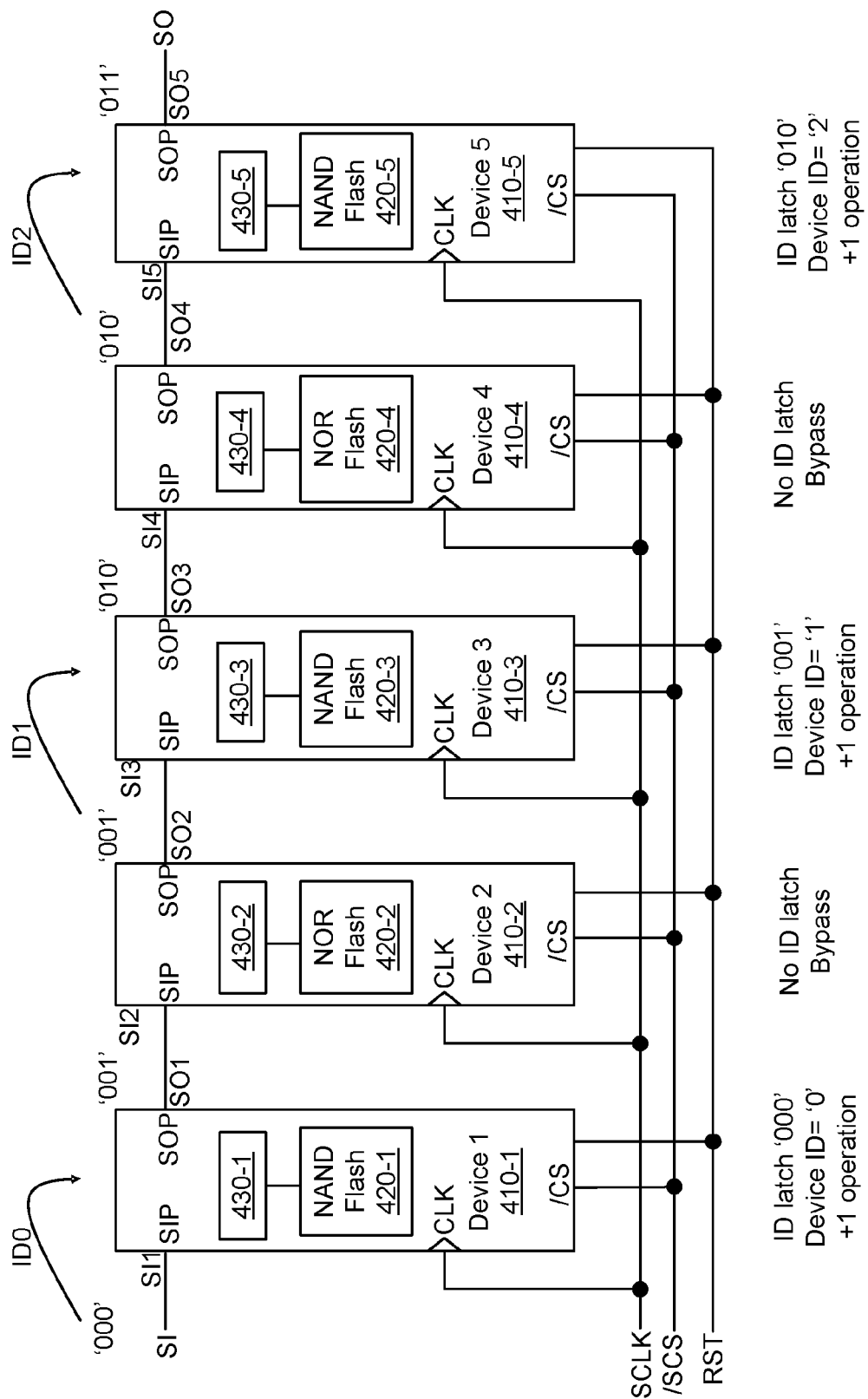
FIG. 8A is a block diagram illustrating the plurality of devices in the serial interconnection configuration shown in FIG. 6A, in which the ID generation of NAND memory devices is performed.
Figure 8B:
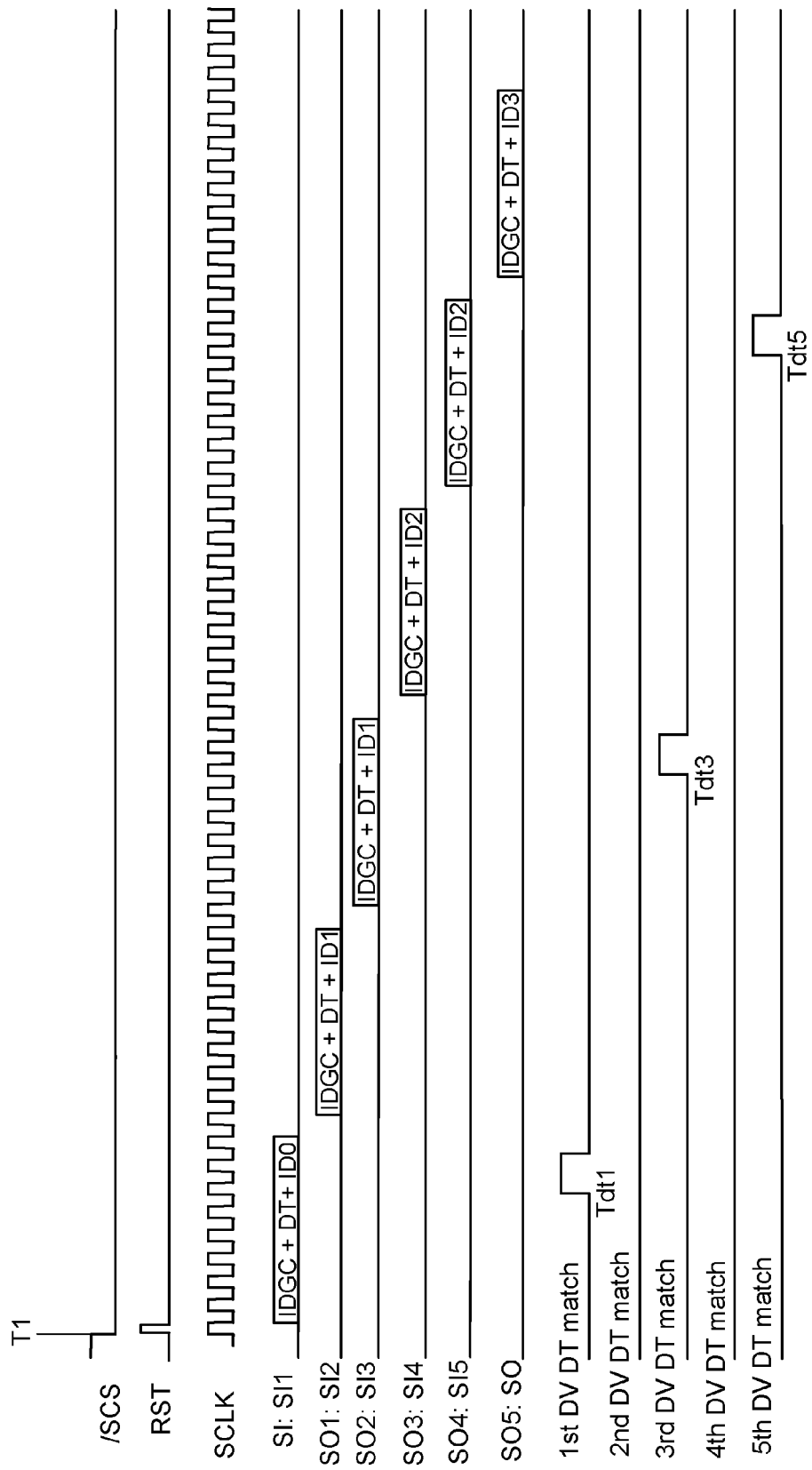
FIG. 8B is a timing diagram of the ID generation in the serial interconnection configuration of FIG. 8A.

FIG. 8A shows the plurality of devices in the serial interconnection configuration of FIG. 6A, in which the ID generation of NAND memory devices is performed. FIG. 8B shows signal timings for the ID generation of NAND memory devices of FIG. 8A.

Referring to FIGS. 8A and 8B, the data on the SIP contains the command, DT and ID bits that are fed to the serial input port (SIP) of device 1, 410-1. The identical devices are serially interconnected. The serial input data to the SIP connection is processed and processed data is outputted as the serial output data from the SOP connection. Due to the nature of the serial interconnection configuration, an intended device for receipt of serial data needs to be identified for data processing. Such an identifier is attached to the serial data as an ID. The ID for device 1, 410-1, is provided by a memory controller such as the memory controller 211 as shown in FIG. 6A. The ID for device 1 might for example be '00h'. The size of the ID depends on the requirements of the system and the number of devices connected in the configuration. Then, device 410-1 provides a serial output SO1 from its SOP connection, the SO1 being fed to device 2, 410-2. Similarly, device 410-2 provides a serial output SO2 to device 3, 410-3. As such, each device receives serial input data from its SIP connection and provides a serial output SO to its neighboring device.

Referring to FIGS. 6A-6D, 7A, 7B, 8A and 8B, the memory controller 211 makes the chip select signal /SCS be "low" at time T1. Immediately thereafter, the memory controller 211 sends the reset signal RST to all devices, so that in response to the internal reset signal 438 provided by the device operation controller 460, the ID registers 431 of each device is reset. The ID register 431 holds the reset state (e.g., '000') until an assigned ID is registered therein. Then, the memory controller 211 provides the serial input SI contains a p-bit ID generation command, an m-bit device type DT, DTsi, and an n-bit identifier ID (initial ID0) to device 1, 410-1. In the example, the initial ID, ID0, is a three-bit number '000'. Then, device 1, 410-1, performs the operations of the device type match determination and the ID assignment.

In the example shown in FIG. 8A, the DT is DTnd for the NAND Flash memory and its DT number or code is '00h' as shown in Table 1. The DT match signals 449 in devices 1, 3 and 5 (410-1, 410-3 and 410-5) (NAND Flash devices) become "high" at determination times Tdt1, Tdt3 and Tdt5, respectively. However, the DT match signals 449 in devices 2 and 4 do not become "high". Thus, devices 2 and 4 (NOR Flash devices) provide no "high" match signal. In response the "high" DT match signals 449, devices 1, 3 and 5 latch or register the IDs of '000', '100' and '010', respectively, and generate new IDs with +1 operation.

In the ID generation method shown in FIG. 7B, alternatively, steps 524 and 525 can be reversed, wherein the "new" ID number (resulting from the "+1" operation) is latched or registered in an ID register. As a result, an assigned ID to the device is the "new" ID number, instead of the received ID number. Accordingly, a memory controller may be configured to address the memory devices in the serial interconnection configuration according to the IDs generated at each device. This will be described later with reference to FIG. 10.

When each device in the serial interconnection configuration has completed the process, all devices with a matching DT number have generated an ID (step 525), and all other devices have refrained from generating an ID (step 527). To generate IDs for these other devices, the process can be repeated for all devices, wherein the device type DTsi is replaced with a value matching the device type number of some or all of the other devices. For example, a first process, with the DTsind matching a NAND Flash device, could be completed at all devices, thereby assigning an ID at each NAND Flash device in the serial interconnection configuration. Afterwards, a second process, with the DTsinr matching a NOR Flash device, could be completed at all devices, thereby assigning an ID at each NOR Flash device in the serial interconnection configuration. The process may be further repeated for other device types (e.g., DRAM, SRAM, MRAM) in the serial interconnection configuration. As a result, each device in the serial interconnection configuration can be uniquely identified in subsequent commands by specifying the ID and DT of that device.

In a case where the stored reference device type DTref of the DT number storage/provider 442 is selected for the NAND Flash memory, the device type DT is "00h" (see Table 1. In the process shown in FIGS. 7A and 7B, at step 522, devices 1, 3 and 5 (410-1, 410-3 and 410-5) determine that the DTsi "match" the stored DTref (the positive determination) and thus, at step 525, the +1 operation is performed for generating a next ID. In devices 2 and 4 (410-2 and 410-4) that are NOR Flash memories, the DT ("01h") do not match the selected stored DT (the negative determination at step 522) and thus, no +1 operation is performed (step 527). At the "no-match" devices, no ID registration (i.e., no ID latch) is performed and thus, the reset "zero state" is maintained in the ID registers. The resulting latched or registered IDs and generated or bypassed IDs are shown in Table 2.

TABLE 2

| Device | Device Type | DT Number or Value | Latched or Registered ID | Generated or Bypassed ID |
|---|---|---|---|---|
| 410-1 | NAND Flash | 00h | 000 | 001 |
| 410-2 | NOR Flash | 01h | 000* | 001 |
| 410-3 | NAND Flash | 00h | 001 | 010 |
| 410-4 | NOR Flash | 01h | 000* | 010 |
| 410-5 | NAND Flash | 00h | 010 | 011 |

In Table 2, "000*" is the reset state, not a latched ID. If a different value or number is used for the reset state, the latched or registered initial ID ("000") will be distinguishable from the reset state.

Figure 9B:
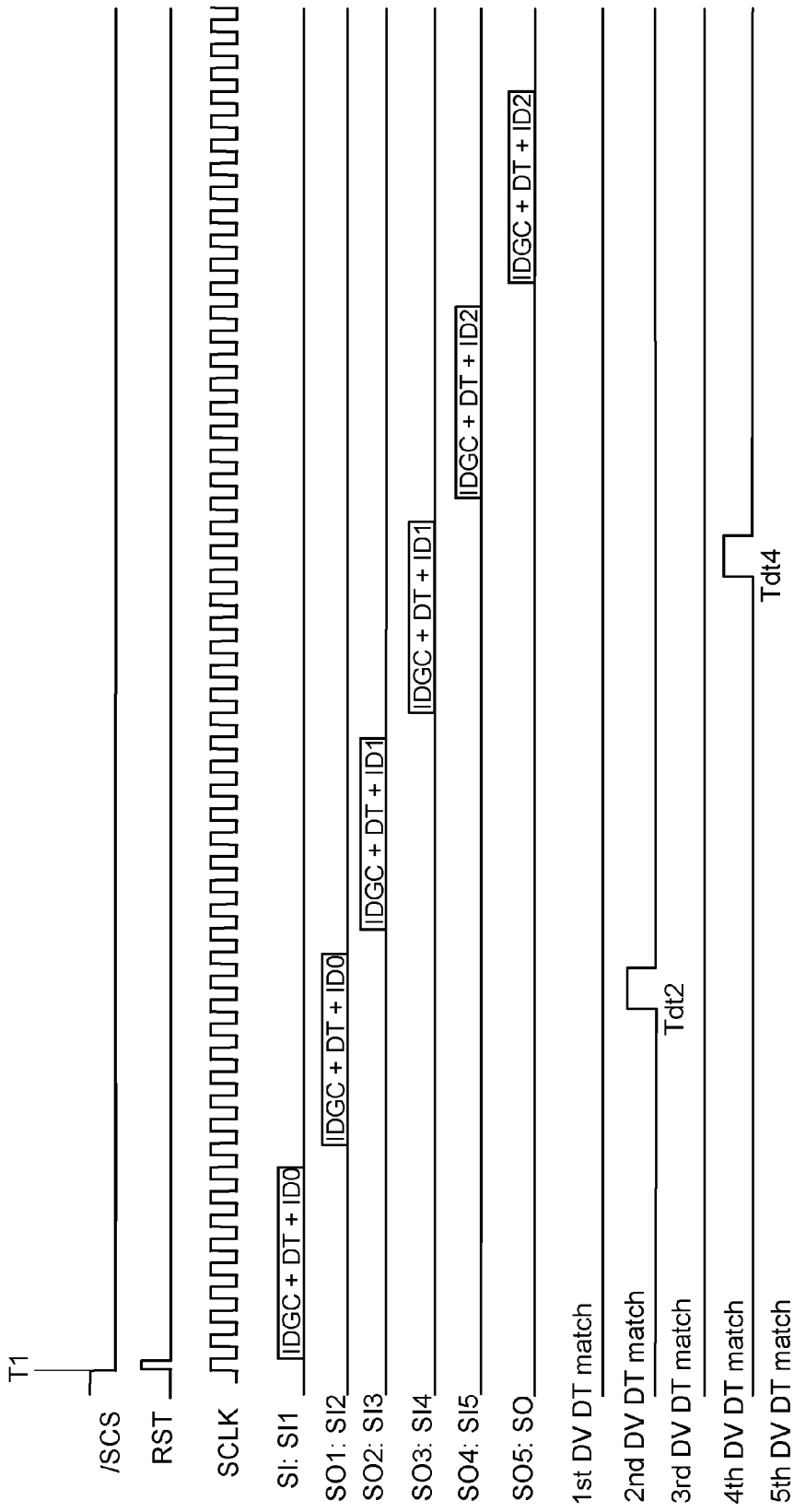
FIG. 9B is a timing diagram of the ID generation in the serial interconnection configuration of FIG. 9A.

FIG. 9A shows the plurality of devices in the serial interconnection configuration shown in FIG. 6A, in which the ID generation of NOR memory devices is performed. FIG. 9B is a timing diagram of the ID generation in the serial interconnection configuration of FIG. 9A.

Referring to FIGS. 6A-6D, 7A, 7B, 9A and 9B, each of five devices 410-1-410-5 includes the device controller 430 that provides a skip function of ID generation. Operation of the serially interconnected devices of FIG. 9A is the same as the case where the stored DT of the DT number storage/provider 442 is selected for the NOR Flash memory, DTnr, the number or code of which is '01h' as shown in Table 1.

The DT match signals 449 in devices 2 and 4 (410-2 and 410-4) (NOR Flash devices) become "high" at determination times Tdt2 and Tdt4, respectively. In response to the "high" device type match signals, devices 2 and 4 latch or register the IDs '000' and '100' and generate new IDs with +1 operation.

However, the DT match signals 449 in devices 1, 3 and 5 do not become "high".

In a case where the stored DT of the DT number storage/provider 442 is selected for the NOR Flash memory, the DT is "01h" (see Table 1). In the process shown in FIG. 7B, at step 522, devices 2 and 4 (410-2 and 410-4) determine that the DTsi "match" the stored DTref and thus, the +1 operation is performed for generating the next ID (step 525). In devices 1, 3 and 5 (410-1, 410-3 and 410-5) that are NAND Flash memories, the DTsi ("00h") does not match the selected stored DTref (the negative determination at step 522) and thus, no +1 operation is performed (step 527). The resulting latched or registered IDs and generated or bypassed IDs are shown in Table 3. In Table 3, "000*" is the reset state.

TABLE 3

| Device | Device Type | DT Number or Value | Latched or Registered ID | Generated or Bypassed ID |
|---|---|---|---|---|
| 410-1 | NAND Flash | 00h | 000* | 000 |
| 410-2 | NOR Flash | 01h | 000 | 001 |
| 410-3 | NAND Flash | 00h | 000* | 001 |
| 410-4 | NOR Flash | 01h | 001 | 010 |
| 410-5 | NAND Flash | 00h | 000* | 010 |

In the examples described above, the latched ID in the ID register 431 of a device is the ID previously generated in the device wherein the device type DT matches the reference device type DTref thereof. Thus, the assigned ID to the present device is the ID generated by the ID generator 434 of another device and received by the present device.

Figure 10:
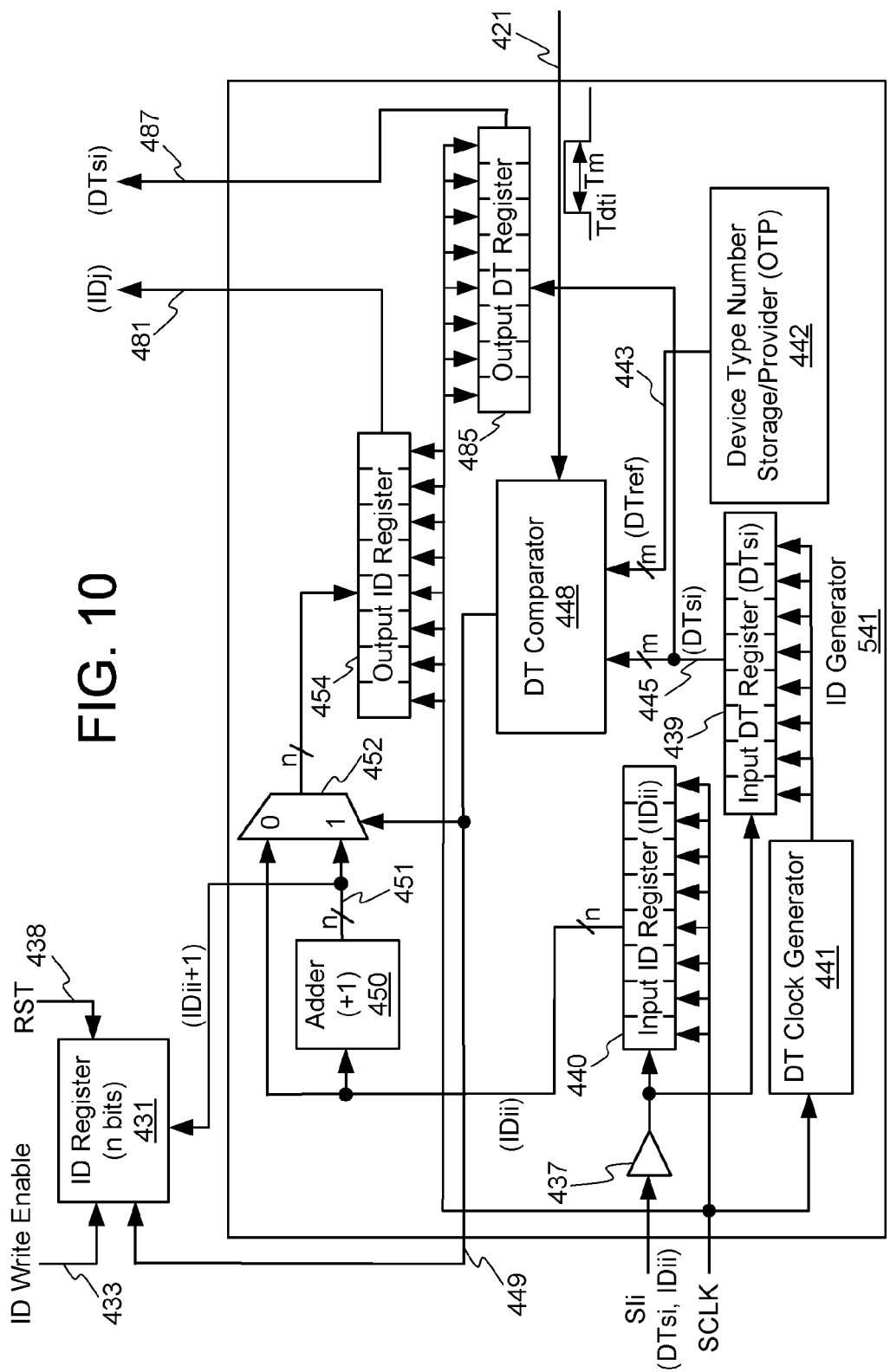
FIG. 10 is a block diagram illustrating another example of the ID generator, in which a generated ID is latched.

Alternatively, a device latches an ID generated thereby before or simultaneously the generated ID is transferred to a next device. In the example, the assigned ID to a device is the ID generated by the device when the device type DT matches the reference device type DTref thereof. Such an example is shown in FIG. 10. An ID generator shown in FIG. 10 is similar to that of FIG. 6D. A difference is that in an ID generator 541 of FIG. 10, the added ID (IDii+1) by the adder 450 is provided to the ID register 431 for registration or latch, instead of the non-calculated (non-altered) ID from the input ID register 440. In this example, the assigned ID is one generated by that device, not one generated by the previous or the other device. Therefore, the latched or registered IDs in the devices are different from ones shown in Tables 2 and 3

Tables 4 and 5 show the latched or registered IDs and the generated or bypassed IDs in the serial interconnection configuration of devices shown in FIG. 6A with the ID generators as shown in FIG. 10, in the cases where the device types provided by the memory controller are the DTnd and DTnr for NAND and NOR Flash memories, respectively. In Tables 4 and 5, "000*" is the reset state, not a latched ID.

TABLE 4

| Device | Device Type | DT Number or Value | Latched or Registered ID | Generated or Bypassed ID |
|---|---|---|---|---|
| 410-1 | NAND Flash | 00h | 001 | 001 |
| 410-2 | NOR Flash | 01h | 000* | 001 |
| 410-3 | NAND Flash | 00h | 010 | 010 |
| 410-4 | NOR Flash | 01h | 000* | 010 |
| 410-5 | NAND Flash | 00h | 011 | 011 |

TABLE 5

| Device | Device Type | DT Number or Value | Latched or Registered ID | Generated or Bypassed ID |
|---|---|---|---|---|
| 410-1 | NAND Flash | 00h | 000* | 000 |
| 410-2 | NOR Flash | 01h | 001 | 001 |
| 410-3 | NAND Flash | 00h | 000* | 001 |
| 410-4 | NOR Flash | 01h | 010 | 010 |
| 410-5 | NAND Flash | 00h | 000* | 010 |

If N devices are serially interconnected, the N-the device provides SON (SO). A general bit structure of the packet bits is "packet start+ID generation command+DT+ID+packet end". Thus, the SI and the provided SO are given by (ID being 'MSB→LSB'):

SI1: Packet including the ID0=Packet start+IDGC+DT+ '0••000'+Packet end

SI2: Packet including the ID1=Packet start+IDGC+DT+ '0••001'+Packet end

S13: Packet including the ID2=Packet start+IDGC+DT+ '0••010'+Packet end

SIN: Packet including the ID(N−1)=Packet start+IDGC+ DT+'1••110'+Packet end.

As such, the packet bit configuration of the serial input is a packet start, command, DT (device type values), ID values (several bits) and a packet end (optional). These information bits are required in the packets. Other information bits may be included in the packet depending on the system requirements. The number of bits of the information in the packet is varied depending on the system requirements. For example, each of the packet start and end includes four bits. The command includes any number of bits depending on the system requirement and memory operation modes. The DT includes, for example, eight bits representing the device type value. The ID includes, for example, eight bits representing the ID value.

Figure 11:
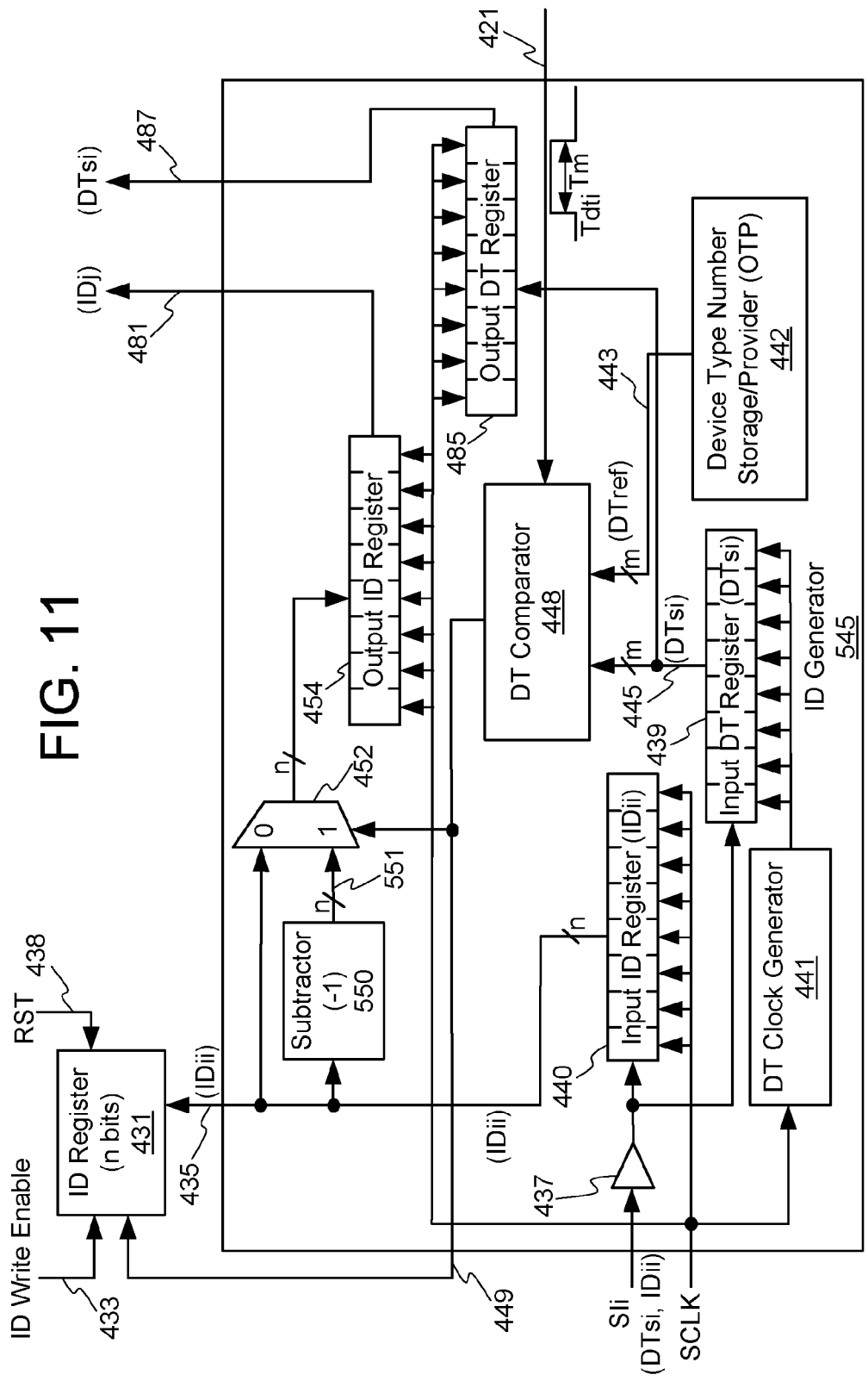
FIG. 11 is a block diagram illustrating another example of the ID generator with a subtractor for ID generation.

FIG. 11 shows another example of the ID generator. An ID generator 545 shown in FIG. 11 is similar to that of FIG. 6D. A difference is that the ID generator 545 has a subtractor 550, instead of the adder 450 of FIG. 6D. The subtractor 550 performs the subtraction of one from the received ID, IDii, to provide a subtracted signal 551 of n-bits to the selector 452. With such a subtraction, consecutive IDs from high to low are generated. If an initial ID number provided by a memory controller is Q (an integer), IDs will be generated in consecutive numbers from Q to low by the devices including the subtractors 550. Each of the subtractor 550 of FIG. 11 and the adder 450 of FIG. 6D performs an arithmetic operation for calculating an ID to be newly generated for another device. The arithmetic operation can be achieved by increment or decrement by one or any other number or value.

Figure 12:
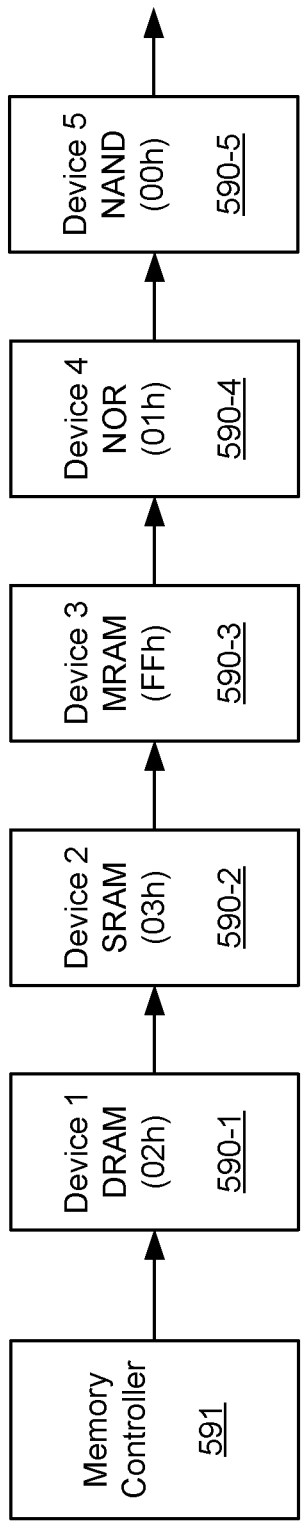
FIG. 12 is a block diagram illustrating a plurality of devices of mixed type in a serial interconnection configuration, in which embodiments of the present invention are implemented.

FIG. 12 shows a plurality of devices of mixed type in a serial interconnection configuration, in which embodiments of the present invention are implemented. In this example, five devices are interconnected. Referring to FIG. 12, devices 590-1-590-5 are a DRAM device, an SRAM device, an MRAM device, a NOR Flash memory device and a NAND Flash memory device, respectively. In a case where the device type DTsi provided by a memory controller 591 is the DTdm for DRAMs, only the DRAM devices generate IDs and latch the IDs therein. Table 6 shows the latched or registered IDs and the generated or bypassed ID in the serial interconnection configuration of devices of mixed type shown in FIG. 12.

TABLE 6

| Device | Device Type | DT Number or Value | Latched or Registered ID | Generated or Bypassed ID |
|---|---|---|---|---|
| 590-1 | DRAM | 02h | 000 | 001 |
| 590-2 | SRAM | 03h | 000* | 001 |
| 590-3 | MRAM | FFh | 000* | 001 |
| 590-4 | NOR Flash | 01h | 000* | 001 |
| 590-5 | NAND Flash | 00h | 000* | 001 |

Similarly, in a case where the device type DTsi provided by the memory controller 591 is the DTsm for SRAMs, only the SRAM devices generate IDs and latch the IDs therein. Table 7 shows the latched or registered IDs and the generated or bypassed ID.

TABLE 7

| Device | Device Type | DT Number or Value | Latched or Registered ID | Generated or Bypassed ID |
|---|---|---|---|---|
| 590-1 | DRAM | 02h | 000* | 000 |
| 590-2 | SRAM | 03h | 000 | 001 |
| 590-3 | MRAM | FFh | 000* | 001 |
| 590-4 | NOR Flash | 01h | 000* | 001 |
| 590-5 | NAND Flash | 00h | 000* | 001 |

In the cases where the device type DTsi provided by the memory controller 591 are the DTsi is the DTmm for MRAMs, the DTnr for NOR Flash memories and the DTnd for NAND Flash memories, only the MRAM devices, NOR Flash memory devices and the NAND Flash memory devices, respectively, generate IDs and latch the IDs therein. Tables 8-10 show the latched or registered IDs and the generated or bypassed IDs in such three cases.

TABLE 8

| Device | Device Type | DT Number or Value | Latched or Registered ID | Generated or Bypassed ID |
|---|---|---|---|---|
| 590-1 | DRAM | 02h | 000* | 000 |
| 590-2 | SRAM | 03h | 000* | 000 |
| 590-3 | MRAM | FFh | 000 | 001 |
| 590-4 | NOR Flash | 01h | 000* | 001 |
| 590-5 | NAND Flash | 00h | 000* | 001 |

TABLE 9

| Device | Device Type | DT Number or Value | Latched or Registered ID | Generated or Bypassed ID |
|---|---|---|---|---|
| 590-1 | DRAM | 02h | 000* | 000 |
| 590-2 | SRAM | 03h | 000* | 000 |
| 590-3 | MRAM | FFh | 000* | 000 |
| 590-4 | NOR Flash | 01h | 000 | 001 |
| 590-5 | NAND Flash | 00h | 000* | 001 |

TABLE 10

| Device | Device Type | DT Number or Value | Latched or Registered ID | Generated or Bypassed ID |
|---|---|---|---|---|
| 590-1 | DRAM | 02h | 000* | 000 |
| 590-2 | SRAM | 03h | 000* | 000 |
| 590-3 | MRAM | FFh | 000* | 000 |
| 590-4 | NOR Flash | 01h | 000* | 000 |
| 590-5 | NAND Flash | 00h | 000 | 001 |

Figure 13A:
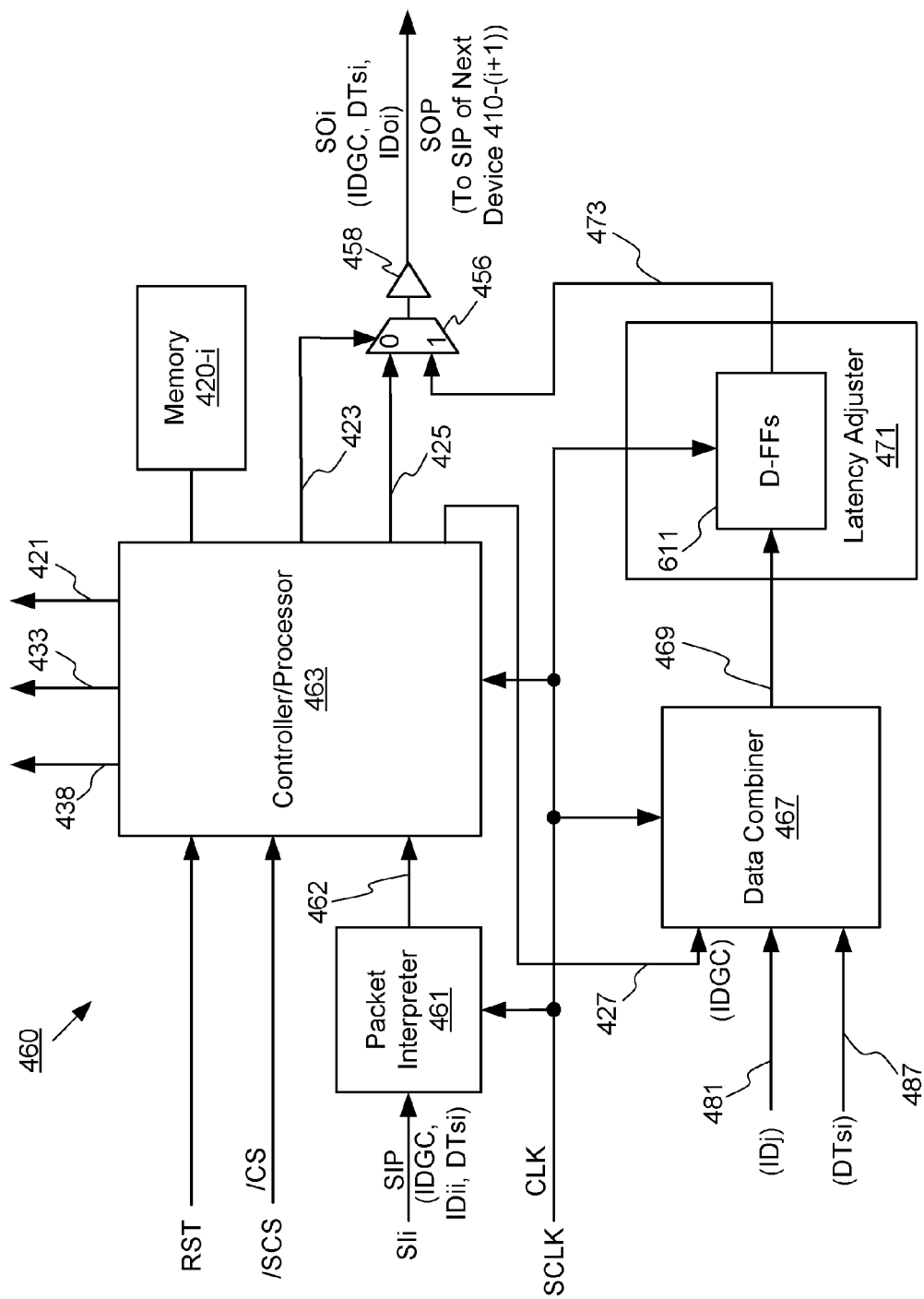
FIG. 13A is a block diagram illustrating another example of a device operation controller of FIG. 6B.
Figure 13B:
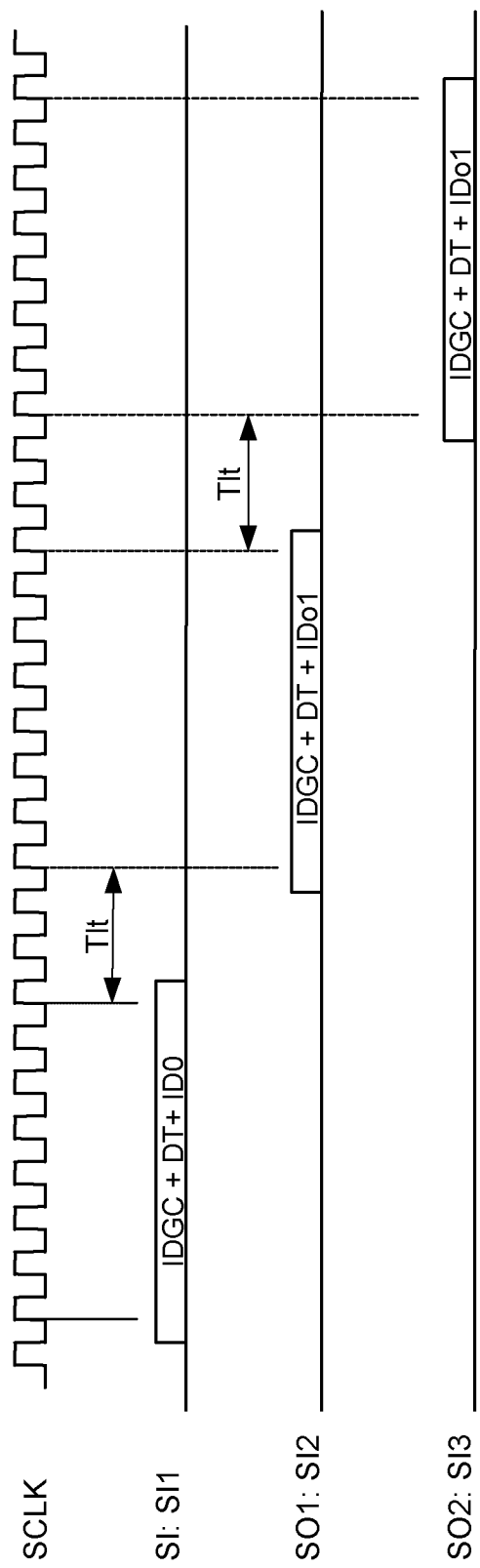
FIG. 13B is a timing diagram of the ID generation with a latency adjustment achieved by the device operation controller shown in FIG. 13A.

FIG. 13A shows another example of the device operation controller 460 of FIG. 6B. Referring to FIG. 13A, the device operation controller includes a latency adjuster 471 having a delay element (e.g., one or more D-flip flop 611) that provides a constant output latency. The data combination signal 469 containing the combined IDGC-DT-ID is provided to the latency adjuster 471 that performs a signal latency adjustment of the combined IDGC-DT-ID in response to the clock signal SCLK. An output signal 473 from the latency adjuster 471 contains the IDGC-DT-ID with the adjusted latency and is provided to the selector 456. In response to the data selection signal 423, the selector 456 selects one of the combined IDGC-DT-ID and the processed data. A selected data is provided through the buffer 458 to the next device 410-($i$+1). Due to the adjusted latency, the ID generation processes between the present device 410-I and the next device 410-($i$+1) are not overlapped. A packet interval between two serial inputs (e.g., SI1 and SI2) is adjusted to be non-overlapped. A time interval TIt is adjusted by the latency adjuster 471, as shown in FIG. 13B. In accordance with the adjusted latency, an output containing the IDGC, the DT and the ID is provided in a packet basis by one device to a next device. The two adjacent devices connected in the serial interconnection configuration are guaranteed enough time margin to perform the interpretation of packet based commands and the functions of the device type match determination and ID generation. The latency adjustment is optional and the system may not need such a latency adjuster.

Figure 14:
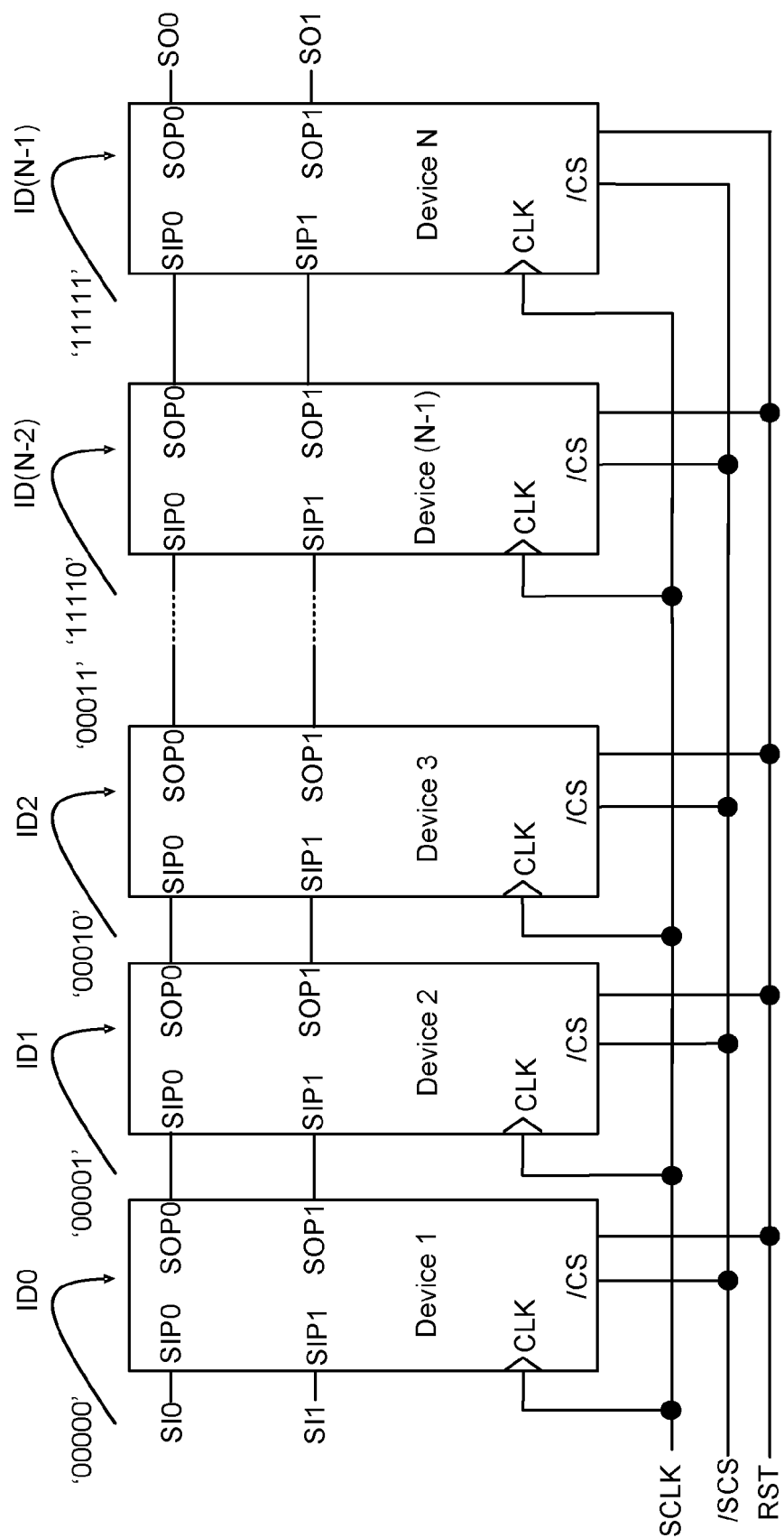
FIG. 14 is a block diagram illustrating a plurality of devices in a serial interconnection configuration operating to generate an ID in dual links.

FIG. 14 shows a plurality of devices in a serial interconnection configuration operating to generate an ID at each device employing an example of ID generation logic for dual links. The connection of the memory devices is different from that of FIG. 6A. FIG. 14 shows an example describing how to generate IDs with dual links of a serial interconnection configuration. In this example, serial inputs SI0 and SI1 are fed into serial input port connections SIP0 and SIP1 of a device and serial outputs SO0 and SO1 are provided from serial output port connections SOP0 and SOP1 of that device. The transferring of the serial inputs SI0, SI1 and the serial outputs SO0, SO1 is separately controlled. Any serial input pin and one control pin can have the same functionality. Also, an ID generation logic may be possible for multiple links wherein a plurality of devices having multiple ports is interconnected.

As described above, the embodiments operate with the SDR. The system and interconnected devices can operate with the DDR as shown in FIG. 2B.

In the above-described examples, the bit structure of the ID stored in the ID register 431 of the devices 410-$i$ and transmitted in a packet is "MSB (Most Significant Bit)→LSB (Least Significant Bit)". The bit structure of each of other data (e.g., "Packet Start", "IDGC", "DT", "Packet End") contained in the packet is also "MSB→LSB". Alternatively, the bit structure of each data contained in a packet can be "LSB→MSB" and the ID bits of "LSB→MSB" can be stored in the ID register 431.

There are variations to the above-described embodiments. The configuration of the devices 120-1-120-4 in FIG. 1 may include both a serial interconnection (e.g., input SIP and output SOP) and conventional multi-drop connections (e.g., SCLK and /SCS). Thus, the configuration may be referred to as a hybrid of serial interconnection and multi-drop configurations, where the advantages of each may be realized. Alternatively, embodiments of the techniques described herein may be implemented in serial, parallel, multi-drop or other connections, and combinations thereof, between devices.

In the above-described embodiments, the operation has been described based on the active "high" signals for the purpose of simplicity. The circuits may be designed to perform the operation based on the "low" active signals, in accordance with a design preference. As mentioned before, it can apply the serial Flash memory or a product with serial input bit stream control.

In the embodiments described above, the device elements and circuits are connected to each other as shown in the figures, for the sake of simplicity. In practical applications of the present invention to apparatus, devices, elements, circuits, etc. may be connected directly to each other. As well, devices, elements, circuits etc. may be connected indirectly to each other through other devices, elements, circuits, etc., necessary for operation of the apparatus. Thus, in actual configuration, the circuit elements and devices are directly or indirectly coupled with or connected to each other.

It is apparent to those of ordinary skill in the art that the ID generators or producers, the controllers, the processors and the other device elements and the memory controllers may be achieved by hardware or software.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for producing a device identifier (ID) by a semiconductor memory device having device type information (DTI), comprising:
at the semiconductor memory device,
receiving a device type (DT) accompanied by an ID;
comparing the DTI of the device to the received DT to provide a comparison result;
outputting an output ID in accordance with the comparison result; and
providing the output ID accompanying the received DT to another semiconductor memory device, the semiconductor memory devices being interconnected to each other.

2. The method of claim 1, wherein the outputting comprises:
performing a calculation based on the received ID to provide an altered ID.

3. The method of claim 2, wherein the outputting further comprises:
selecting one of the altered ID and a non-altered ID in response to the determination result, the non-altered ID being the received ID, thereby outputting a selected ID as the output ID.

4. The method of claim 3, wherein the providing comprises:
combining the selected ID and the received DT, the combined ID and DT being provided to the other semiconductor memory device.

5. The method of claim 4, further comprising:
sending the combined ID and DT in a packet.

6. The method of claim 5, wherein the receiving comprises:
receiving the DT and the input ID in a packet.

7. The method of claim 6, wherein:
the combining comprises combining an ID production command, the selected ID and the received DT;
the sending comprises sending the combined command, DT and ID in a packet; and
the receiving comprises receiving an ID production command, the DT and the input ID in a packet.

8. The method of claim 2, wherein the performing comprises:
adding a pre-determined value to the received ID to provide the altered ID.

9. The method of claim 2, wherein the performing comprises:
   subtracting a pre-determined value from the received ID to provide the altered ID.

10. An apparatus for use in a semiconductor memory device having device type information (DTI), comprising:
   a receiver configured to receive a device type (DT) accompanied by a device identifier (ID);
   a comparator configured to compare the DTI of the device to the received DT to provide a comparison result;
   an ID provider configured to output an ID in accordance with the comparison result; and
   an output provider for providing the outputted ID accompanying the received DT to another semiconductor memory device.

11. The apparatus of claim 10, further comprising:
   a device type provider configured to provide the DTI associated with the semiconductor memory device.

12. The apparatus of claim 11, wherein the ID provider comprises:
   an arithmetic operator configured to perform a calculation or non-calculation of the received ID with a pre-defined value to provide a calculated ID or a non-calculated ID as the outputted ID.

13. The apparatus of claim 12, wherein the comparator comprises:
   a DT match detector configured to detect a match between the received DT and the provided DTI, thereby providing a match determination result when there is a match therebetween,
      the calculated ID being selected as the outputted ID in response to the match determination result,
      the non-calculated ID being selected as the outputted ID in response to a no-match determination result.

14. The apparatus of claim 12, wherein the arithmetic operator comprises:
   a calculator configured to calculate the received ID with the pre-defined value.

15. The apparatus of claim 14, wherein the calculator comprises:
   an adder configured to add one to the received ID.

16. The apparatus of claim 14, wherein the calculator comprises:
   a subtractor configured to subtract one from the received ID.

17. The apparatus of claim 12, wherein the output provider comprises:
   an ID-device type provider configured to output the outputted ID accompanying the received DT to another semiconductor memory device, the semiconductor memory device and the other semiconductor memory device being interconnected to each other.

18. The apparatus of claim 17, wherein:
   the outputted ID and the DT are provided in a parallel manner; and
   the output provider comprises first and second holders,
      the first holder registering the parallel ID and outputting the ID in serial manner,
      the second holder registering the parallel DT and outputting the DT in a serial manner.

19. The apparatus of claim 18, wherein the output provider further comprises:
   a serial data combiner configured to combine the serial ID and DT to provide a combined serial ID and DT as the ID accompanying the received DT.

20. The apparatus of claim 19, wherein:
   the semiconductor memory device is one of a plurality of semiconductor memory devices of mixed type, the semiconductor memory devices being serially interconnected.

21. The apparatus of claim 19, wherein the serial data combiner comprises:
   a data processor configured to combine an ID production command, the DT and the ID in a packet, the packet being sent to the other semiconductor memory device.

22. The apparatus of claim 20, wherein the receiver comprises:
   a packet receiver configured to receive an ID production command, the DT and the input ID in a packet.

* * * * *

UNITED STATES PATENT AND TRADEMARK OFFICE
CERTIFICATE OF CORRECTION

Page 1 of 1

PATENT NO.        : 8,694,692 B2
APPLICATION NO.   : 13/671248
DATED             : April 8, 2014
INVENTOR(S)       : Hong Beom Pyeon et al.

It is certified that error appears in the above-identified patent and that said Letters Patent is hereby corrected as shown below:

In the Specification

Column 18, line 66, insert the following paragraph

-- In Tables 6 – 10, "000*" is the reset state and it is not a latched initial ID. If a different value or number is used for the reset state, the latched or registered initial ID ("000") will be distinguishable from the reset state. --

Signed and Sealed this
Twenty-second Day of July, 2014

Michelle K. Lee
*Deputy Director of the United States Patent and Trademark Office*